US008499197B2

(12) United States Patent (10) Patent No.: US 8,499,197 B2
Hsiao et al. (45) Date of Patent: Jul. 30, 2013

(54) DESCRIPTION LANGUAGE FOR IDENTIFYING PERFORMANCE ISSUES IN EVENT TRACES

(75) Inventors: Shuo-Hsien Hsiao, Redmond, WA (US); Prashant Ratanchandani, Sammamish, WA (US); Jason Carl Hendrickson, Seattle, WA (US); Richard G. Russell, Sammamish, WA (US); Nathan Teeuwen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 12/946,228

(22) Filed: Nov. 15, 2010

(65) Prior Publication Data

US 2012/0124422 A1 May 17, 2012

(51) Int. Cl.
*G06F 11/00* (2006.01)
(52) U.S. Cl.
USPC .......................................... 714/38.1; 714/45
(58) Field of Classification Search
USPC .......................................................... 714/38
See application file for complete search history.

(56) References Cited

U.S. PATENT DOCUMENTS

| 5,107,497 | A | 4/1992 | Lirov et al. |
| 7,263,632 | B2 | 8/2007 | Ritz et al. |
| 7,352,706 | B2 * | 4/2008 | Klotz et al. ................... 370/254 |
| 7,441,154 | B2 * | 10/2008 | Klotz et al. ....................... 714/39 |
| 7,571,076 | B2 * | 8/2009 | Matsuzaki et al. ............ 702/182 |
| 7,606,814 | B2 | 10/2009 | Deily et al. |
| 7,664,048 | B1 | 2/2010 | Yung et al. |
| 8,131,843 | B2 | 3/2012 | Yellin et al. |
| 2002/0152305 | A1 | 10/2002 | Jackson et al. |
| 2002/0169658 | A1 * | 11/2002 | Adler ................................ 705/10 |
| 2003/0145125 | A1 * | 7/2003 | Horikawa ....................... 709/318 |
| 2004/0054776 | A1 * | 3/2004 | Klotz et al. .................... 709/224 |
| 2004/0057389 | A1 * | 3/2004 | Klotz et al. .................... 370/252 |
| 2004/0059807 | A1 * | 3/2004 | Klotz et al. .................... 709/223 |
| 2004/0078667 | A1 | 4/2004 | Salem |
| 2004/0153863 | A1 * | 8/2004 | Klotz et al. ....................... 714/45 |
| 2005/0060574 | A1 * | 3/2005 | Klotz et al. .................... 713/201 |
| 2005/0060598 | A1 * | 3/2005 | Klotz et al. ........................ 714/4 |
| 2005/0076113 | A1 * | 4/2005 | Klotz et al. .................... 709/224 |

(Continued)

OTHER PUBLICATIONS

Android, "Traceview: A Graphical Log Viewer," Original publication date unknown, retrieved Aug. 11, 2010, 5 pages, http://developer.android.com/guide/developing/tools/traceview.html.

(Continued)

*Primary Examiner* — Kamini Patel
(74) *Attorney, Agent, or Firm* — Chin IP, PLLC; Davin Chin

(57) ABSTRACT

A description language and a tool for identifying, analyzing and addressing performance issues in event traces. With this language, a behavior descriptor may be defined to describe a simple behavior within a performance trace, by specifying values for a relatively small number of attributes. Even a relatively unsophisticated user can define behavior descriptors, but complex behaviors may be defined based on interactions between multiple behavior descriptors. A trace analysis tool may use a library of behavior descriptors to identify performance issues in performance traces by matching behavior descriptors to the performance trace. This analysis may be used in any number of ways, including reporting to a user detected performance issues reflected in a set of performance traces, filtering a set of performance traces to remove those performance traces corresponding to known performance issues or prioritizing efforts to resolve performance issues.

20 Claims, 12 Drawing Sheets

U.S. PATENT DOCUMENTS

| | | | |
|---|---|---|---|
| 2005/0210331 A1 | 9/2005 | Connelly et al. | |
| 2006/0005080 A1* | 1/2006 | Walker et al. | 714/38 |
| 2006/0101416 A1 | 5/2006 | Callahan et al. | |
| 2006/0256726 A1* | 11/2006 | Jennings | 370/241 |
| 2007/0207800 A1* | 9/2007 | Daley et al. | 455/425 |
| 2007/0239766 A1 | 10/2007 | Papaefstathiou et al. | |
| 2008/0001956 A1 | 1/2008 | Markovic et al. | |
| 2008/0040634 A1* | 2/2008 | Matsuzaki et al. | 714/47 |
| 2008/0059972 A1 | 3/2008 | Ding et al. | |
| 2008/0127108 A1* | 5/2008 | Ivanov et al. | 717/128 |
| 2008/0140469 A1 | 6/2008 | Iqbal et al. | |
| 2008/0215922 A1* | 9/2008 | Cheng et al. | 714/39 |
| 2009/0044176 A1* | 2/2009 | Cascaval et al. | 717/128 |
| 2009/0063387 A1 | 3/2009 | Beaty et al. | |
| 2009/0282404 A1* | 11/2009 | Khandekar et al. | 718/1 |
| 2009/0300166 A1 | 12/2009 | Chen et al. | |
| 2009/0320021 A1* | 12/2009 | Pan et al. | 718/100 |
| 2010/0070319 A1 | 3/2010 | Prafullchandra et al. | |
| 2010/0107143 A1* | 4/2010 | Emberling | 717/128 |
| 2010/0223425 A1 | 9/2010 | Meagher et al. | |
| 2010/0295856 A1* | 11/2010 | Ferreira et al. | 345/441 |
| 2011/0004443 A1* | 1/2011 | Horikawa | 702/186 |
| 2012/0173928 A1* | 7/2012 | Bohrer et al. | 714/28 |

OTHER PUBLICATIONS

Compuware, "Application Performance Management," Aug. 5, 2010, 2 pages, http://www.compuware.com/solutions/application-performance-management.asp.

De Vitt, D., "Tracing Resource Consumption of Solaris™ PC NetLink Software," Sun BluePrints™, Dec. 1, 1999, 13 pages, http://www.sun.com/blueprints/1299/tracingsolaris.pdf.

Gopalakrishnan, S., "Capturing and Analyzing an ETW Trace (Event Tracing for Windows)," Feb. 26, 2009, 2 pages, http://blogs.msdn.com/b/sudeepg/archive/2009/02/25/capturing-and-analyzing-an-etw-trace-event-tracing-for-windows.aspx.

Cohen et al., "Capturing, Indexing, Clustering, and Retrieving System History," Oct. 2005, 15 pages, http://www.hpl.hp.com/techreports/2005/HPL-2005-158.pdf.

International Search Report and Written Opinion mailed Nov. 2, 2011 in PCT application PCT/US2010/061343, filed Dec. 20, 2010, 9 pages.

Non-Final Office Action mailed Nov. 28, 2012 in U.S. Appl. No. 12/946,229, 11 pages.

Saidi et al., "Full System Critical Path Analysis," Apr. 2008, 12 pages, http://www.eecs.umich.edu/~stever/pubs/ispass08.pdf.

Sandeep et al., "CLUEBOX: A Performance Log Analyzer for Automated Troubleshooting," 2008, 8 pages, http://www.usenix.org/event/wasl08/tech/full_papers/sandeep/sandeep.pdf.

White Paper, "Automating Root-Cause Analysis: EMC Ionix Codebook Correlation Technology vs. Rules-based Analysis," Nov. 2009, 12 pages, http://www.emc.com/collateral/software/white-papers/h5964-automating-root-cause-analysis-wp.pdf.

Yuan et al., "Automated Known Problem Diagnosis with Event Traces," Apr. 2006, pp. 375-388, http://www.cs.cmu.edu/~nlao/publication/older/p375-yuan.pdf.

Final Office Action mailed Apr. 25, 2013 in U.S. Appl. No. 12/946,229, 11 pages.

\* cited by examiner

1000

| Signature ID: | DD714B2B-2115-4BB4-8B8C-E71B88EE44D9 | Generate |
| Title: | CU-avgrsx | Generate |
| Description: | CPU usage in avgrsx.exe (AVG anti-virus) | |
| Signature Type: | Basic ▼ | |
| Trace Type: | ⊃ Insert Trace Type | |
| Category: | Cpu Usage [CU] ▼ | |
| Component: | avgrsx.exe | Select |
| Author Alias: | prashrat | Get my name |

Recognitions:

CPU Usage
    Process Name:

| avgrsx.exe |

⊃ Insert Thread Start Function
  ⊃ Insert Duration Filter
  ⊃ Insert Sample Profile Stack CPU Usage
    Process Name:

| avgrsa.exe |

⊃ Insert Thread Start Function
  ⊃ Insert Duration Filter
  ⊃ Insert Sample Profile Stack ▼ Insert Recognition
Additional Comments:

{LogonUI-LaunchToReadyForInput}
Trace #27178

Old Signature Id: prashrat33

FIG. 10

```xml
<RegionOfInterest>
  <RegionType>PerfTrack</RegionType>
  <RegionInformation>
    <PerfTrack>
      <ScenarioName>Office-PPT-NonResponsive</ScenarioName>
      <IsSnapshotScenario>false</IsSnapshotScenario>
    </PerfTrack>
  </RegionInformation>
  <StartTime>13641516734470</StartTime>
  <EndTime>13642632061266</EndTime>
  <Duration>1115326796</Duration>
  <AnalysisType>Critical Path</AnalysisType>
  <RootCauses>
    <RootCauseData>
      <PerformanceSignatureId>ABDDE3D0-5287-4EFF-B65F-423FD3EBCAD8</PerformanceSignatureId>
      <PerformanceSignatureTitle>LC-ntIExEnterPriorityRegionAndAcquireResourceExclusive</PerformanceSignatureTitle>
      <HitCount>159</HitCount>
      <CumulativeTime>19</CumulativeTime>
      <RootCauseData Rel="Waitee">
        <PerformanceSignatureId>F50E4D8E-3D72-41DA-95A0-797B9D2FE63A</PerformanceSignatureId>
        <PerformanceSignatureTitle>WS-explorer!Ctray_MainThreadProc-explorer</PerformanceSignatureTitle>
        <HitCount>12</HitCount>
        <CumulativeTime>2</CumulativeTime>
      <RootCauseData Rel="Callee">
        <PerformanceSignatureId>ABDDE3D0-5287-4EFF-B65F-423FD3EBCAD8</PerformanceSignatureId>
        <PerformanceSignatureTitle>LC-ntIExEnterPriorityRegionAndAcquireResourceExclusive</PerformanceSignatureTitle>
        <HitCount>8</HitCount>
        <CumulativeTime>1</CumulativeTime>
      </RootCauseData>
```

FIG. 11

DESCRIPTION LANGUAGE FOR IDENTIFYING PERFORMANCE ISSUES IN EVENT TRACES

BACKGROUND

Performance of a computer system executing different applications may be tracked by collecting performance traces. A trace can be defined as a sequence of values representing events or an operating system state. Traces provide information on performance of the computer system, including information on a sequence of operations during execution of applications, resource utilization, encountered problems and others. Accordingly, analysis of the traces may provide useful insights into the performance of the computer system and may help address performance issues. An example of a tool for trace analysis includes WINDOWS PERFORMANCE TOOLKIT developed by Microsoft Corp.

Currently, a large number of traces are available for analysis. For example, users of Microsoft WINDOWS® operating system can opt to have their computers send traces to a centralized error reporting service when certain types of problems are encountered during operation of a computer system. For example, certain types of performance issues or problems associated with resource usage detected by the operating system or users may be reported. The collected traces may be analyzed by a software development team to identify underlying performance issues, such as a bug in an application program or an unintended interaction between multiple application programs.

Analysis of a collection of event traces may be performed manually. It is also known that a software development team may develop a custom analysis program to process many event traces and identify whether a particular performance issue has occurred.

SUMMARY

The subject matter relates generally to a tool for analyzing event traces, such as traces that may be collected from multiple computer systems. The event traces may be collected when users utilizing the computer systems experience errors.

Applicants have appreciated that event traces, sometimes called performance traces, may be analyzed in an efficient manner by creating simple behavior descriptions. Each behavior descriptor may define a particular behavior of a process or other component. A behavior descriptor, once defined, may be applied to any event trace to detect a corresponding behavior pattern within the trace.

Behavior descriptors may have a format that allows them to be quickly defined. Each behavior descriptor may comprise attributes, including attributes indicating how the behavior descriptor is recognized within a performance trace and information related to the behavior defined by the behavior descriptor. These attributes may be used in analysis of performance traces or in presenting to a user results of such analysis. Some of the attributes for the behavior descriptors may provide information on resolving performance issues that may give rise to traces matching one or more behavior descriptors.

By specifying values for one or more of these attributes, even a person with limited experience analyzing performance traces can create a behavior descriptor that can be applied to analyzing large numbers of traces. Each behavior descriptor may be defined using a suitable standard, such as an XML schema, which allows the behavior descriptor to be defined by a user specifying values of parameters that are represented as elements of the schema. The behavior descriptors may be defined by performance analysts, developers or any other users. An interface may be provided to receive input from the users to define behavior descriptors.

In some scenarios, identifying that a behavior represented by a behavior descriptor occurs within a trace may reveal a performance issue. In other scenarios, a performance issue may be revealed based on an interaction between different behaviors described by behavior descriptors, such that analysis of a performance trace may entail searching for interactions between the behaviors.

For purposes of this description, interactions between behaviors defined by respective behavior descriptors are described in terms of interaction between the behavior descriptors. Interactions between behavior descriptors may take one or more forms. In some embodiments, the interaction between behavior descriptors may be a hierarchical relationship. A hierarchy of more than one behavior descriptor in which a behavior descriptor may be a superset of one or more other behavior descriptor(s) may be used. The hierarchy may reveal a root cause of the issue identified by applying the multiple behavior descriptors to the traces. The interaction between behavior descriptors alternatively may show that a behavior descriptor is waiting on another behavior descriptor or that a behavior descriptor has called another behavior descriptor.

In some embodiments, behavior descriptors may be applied in an automated fashion to analyze a set of performance traces. The performance traces may be collected from multiple computing devices that, with user consent, may supply event traces to a centralized error reporting service. In some scenarios, the behavior descriptors may characterize performance traces reflecting known bugs or other performance issues and may be used to remove those performance trace from the set, thereby reducing the amount of human effort required to review the performance traces. As a human identifies new performance issues reflected in the set, the human can simply define one or more new behavior descriptors, characterizing the issue.

In other scenarios, the behavior descriptors may help a software development team identify new performance issues by allowing patterns of behavior to be recognized and also providing information about the pattern that may help a human developer recognize an underlying performance issue. In addition, automated matching may help a development team prioritize development efforts, such as by allowing the team to quickly identify the frequency of occurrence of each underlying performance issue or an impact of a performance issue, such that development efforts may be directed at frequent or severe issues.

In some scenarios, the behavior descriptors may help a user identify and resolve known performance issues that may occur in a computer system operated by the user. The automated matching may be used to identify such performance issues by using behavior descriptors describing the issues. The results of application of behavior descriptors to event traces may be presented to a user or used in other ways. If presented to a user, the presentation may be visual, in a manner that allows the user to understand the execution patterns and their relationships. For example, locations within an application or other code and associated resource utilization may be identified. In addition, a behavior descriptor may define a way in which the corresponding behavior may be expressed quantitatively. Thus, in some scenarios, such quantitative information may be presented to the user. The user may therefore address issues associated with the execution patterns in an efficient manner.

The foregoing presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

FIG. 10 is an example of a computer interface through which user input may be provided to define a behavior descriptor, in accordance with some embodiments of the invention;

FIG. 11 is a snippet of results of analysis of a performance trace using techniques in accordance with some embodiments of the invention.

DETAILED DESCRIPTION

Figure 1:
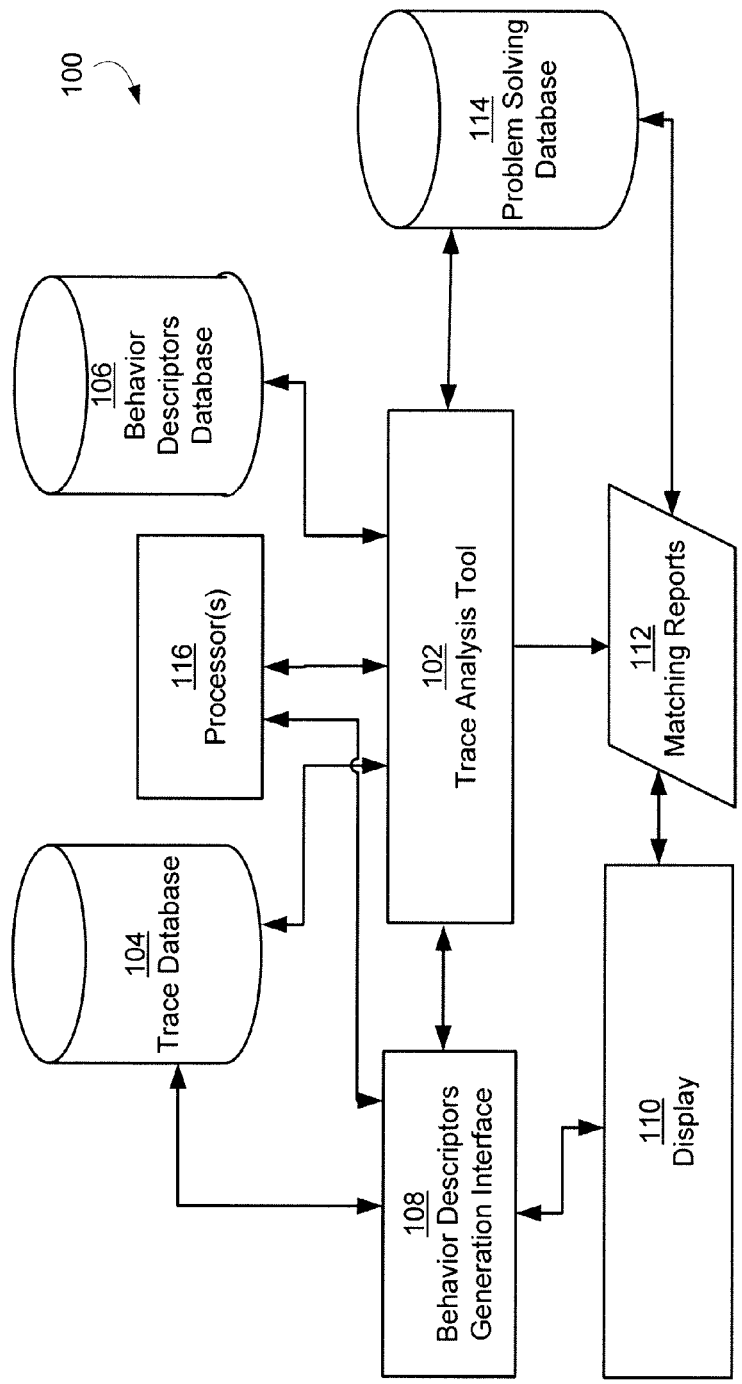
FIG. 1 is a block diagram of a system in which some embodiments of the invention may be implemented.

Applicants have recognized and appreciated that software quality may be improved with a tool that analyzes performance traces based on relatively simple behavior descriptors. The behavior descriptors may have a simple form, allowing new behavior descriptors to be quickly added as new performance issues are recognized. Yet, automated matching of one or more behavior descriptors to a performance trace and automated recognition of interaction between behaviors described by the matching behavior descriptors allow even complex issues to be identified. Such a tool may increase the speed and decrease the effort required to identify and resolve performance issues.

Applicants have recognized and appreciated that a description language may be provided to describe behaviors that may be identified in performance traces. Each behavior pattern may be described in a standardized form so that the behavior descriptors may be simply created, potentially by multiple different individuals, and applied by any of a number of tools. The standardized form may be, for example, an XML format or a representation using any other suitable language.

The standardized description of a certain behavior may be defined as a behavior descriptor. A performance issue may be characterized by a single behavior descriptor. Though, more complex performance issues may be described using more than one behavior descriptor and an interaction between those behavior descriptors. For purposes of this description, interactions between behaviors defined by respective behavior descriptors are described in terms of interaction between the behavior descriptors.

Users, such as performance analysts, developers having different expertise and any others, may create behavior descriptors describing different behaviors, which may be within respective areas of expertise of the users. Accordingly, the description language in accordance with some embodiments of the invention may provide a way for experts in different areas to share their knowledge on recognizing and addressing performance issues in computer systems. Though, the description language may be relatively simple, such as by describing behaviors by specifying values for a limited number of attributes. In this way, even users who are not sophisticated in analysis of performance traces may define behaviors that can be used by automated tools for performance analysis.

Accordingly, in some embodiments of the invention, a trace analysis tool is provided for analyzing any suitable performance traces based on a set of behavior descriptors defined using such a simple descriptor language. The tool may be applied, for example, to analyze a large number of performance traces collected from users of computer systems when the user opts for such collection. In some scenarios, performance traces stored on a user computer may be analyzed. The trace analysis tool may apply one or more behavior descriptors to a performance trace and compare each of the behavior indicators to the performance trace. The trace analysis tool may thus determine whether the behavior descriptor matches the performance trace, which indicates that the behavior described by the behavior descriptor exists in the performance trace.

Information on behavior descriptors matching one or more traces may be used in multiple different ways as part of quality improvement effort for software. For example, if the matching is detected, information on behavior described by a corresponding behavior descriptor may be accessed. The information may be in any suitable form. For example, the information may be presented in a report, which may be provided to a user on a display. Information on the matching may also be stored in a suitable form.

As another example, when a matching behavior descriptor or interaction of descriptors corresponds to a known performance issue, traces representing known performance issues may be identified and removed from a set of traces, thereby eliminating redundancy resulting from analyzing traces representing known issues. As yet another example, automated matching may be used to prioritize or focus development efforts. As a specific example, a problem affecting multiple applications may be traced to an underlying behavior attributable to an interference between two components. If that interference is captured as a behavior descriptor, the tool may reveal that multiple, seemingly unrelated, performance issues have a common cause. Appropriate resources may be allocated with a high priority to addressing that cause. Further, information assessed by matching behavior descriptors may be presented to a developer, which may also expedite correction of performance issues.

As yet another example, the automated matching may be used to automatically identify known performance issues and provide appropriate solutions to the performance issues to a user. The user thus may not need to perform a manual analysis of performance issues.

In some embodiments, the trace analysis tool may analyze one or more performance traces to assess behaviors related to a critical path of execution of the computer system. A critical-path analysis may be used to address issues directly related to the responsiveness of the computer system, as compared to identifying behavior which does not directly impact the responsiveness.

The critical path may be defined as a path along which, if any performance issue were to be fixed, a duration of a given operation (e.g., opening of a "Start" menu) may be decreased. Thus, the analysis of a performance trace may assess constituents of the performance trace which may directly result in an increased responsiveness or a decreased duration of a task, including both user-perceivable tasks and those which are may not be directly user-perceivable.

The trace analysis tool may also analyze behaviors related to background activity executing on the computer system. For this purpose, behavior descriptors that describe resource consumption and other behavior descriptors may be utilized. Behavior descriptors used to recognize behaviors (e.g., different delays) related to the background activity may also help to identify performance issues affecting the critical path.

Turning now to FIG. 1, a system 100 is illustrated in which some embodiments of the invention may be implemented. Components of system 100 may be implemented within a computer device comprising one or more processors and one or more memories of any suitable types. Though, the components may also be apportioned among more than one computer device in any suitable manner. Those computer devices may be connected with a network. Also, some of the components of system 100 may be stored in suitable storage location(s), which may be remote from system 100.

As shown in FIG. 1, system 100 may comprise a trace analysis tool 102, which may analyze performance traces by comparing multiple behavior descriptors to each performance trace.

Trace analysis tool 102 may access one or more performance traces available for analysis from a trace database 104. Trace database 104 may store any suitable number of performance traces. Performance traces may be received at trace database 104 by any suitable manner. For example, users of Microsoft WINDOWS® operating system may opt to have their computers send performance traces to a centralized error reporting service when certain types of errors are encountered during operation of the computer. Such performance traces may be stored in trace database 104 for future analysis. Though, it should be appreciated that trace database 104 may represent a subset selected from a full set of performance traces collected at an error reporting service. The subset may include, for example, those traces received over a time interval or being associated with a particular error code. Accordingly, the specific techniques and criteria by which a set of error traces is collected for analysis is not critical to the invention.

Trace database 104 may be stored on the same computer device on which trace analysis tool 102 is executed or on one or more of other suitable computer devices. It should be appreciated that even though trace database 104 is shown in FIG. 1 as one component, the database may span a number of any storage media suitable for storing performance traces.

Trace analysis tool 102 may employ a plurality of behavior descriptors to analyze performance traces in trace database 104. Prior to being used by trace analysis tool 102, multiple behavior descriptors may be defined in a suitable manner to define a library of behavior descriptors, which is then stored in a suitable storage such as in a behavior descriptors database 106. Trace analysis tool may apply behavior descriptors stored in behavior descriptors database 106 to any of the performance traces stored in trace database 104.

In some embodiments, behavior descriptors in behavior descriptors database 106 may be classified into a number of categories. The categories of the behavior descriptors may be defined based on behavior descriptors' types, affected resources, severity of an impact on performance of computer systems and any other suitable factors. Exemplary categories may include CPU usage, CPU waits, CPU priority inversion, heavy disk load, I/O interference, disk spindown, I/O priority, inversion, out of order I/O, memory overstressed, power management, yield, wait work item exception, wait analysis break and others. Some of the categories may encompass complex issues that are identified using more than one behavior descriptor.

System 100 may comprise behavior descriptors generation interface 108 through which the system may receive user input defining behavior descriptors. The user input may be received via a graphical user interface (not shown) or other suitable interface. A user, such as a software developer or a performance analyst, may utilize behavior descriptors generating interface 108 to define a behavior descriptor describing a particular behavior. A performance analyst, for example, may define a behavior descriptor based on information gleaned from analyzing a performance trace from trace database 104 or in any other suitable way.

In some embodiments, behavior descriptors may be defined according to a schema that contains multiple elements, each corresponding to an attribute of the behavior descriptor. These attributes may provide information on how the behavior descriptor is matched to a performance trace and information that describes in a user-friendly manner behavior identified by the behavior descriptor. Accordingly, system 100 provides a convenient and a user-friendly way to define behavior descriptors by specifying values for attributes within a set of attributes. Thus, when a user defines a behavior descriptor, behavior descriptors generating interface 108 may receive user input specifying one or more attributes of the behavior descriptor. Though, it should be appreciated that behavior descriptors may be defined in any other suitable way.

A user may obtain information to define a behavior descriptor in any suitable way. For example, a user may analyze (e.g., by a manual inspection or using a suitable tool) results of processing of a performance trace and determine that certain behavior within the performance trace may be considered as a new behavior that is itself a performance issue or appears in connection with performance issues being analyzed. Such a new behavior may be described, using behavior descriptors generating interface 108, as a behavior descriptor which may then be added to behavior descriptors database 106.

In some embodiments, a user (e.g., a software developer or any other user) developing a software code may identify one or more performance-sensitive paths of execution of the software code. The user may define behavior descriptor(s) which may be used to identify a degree to which the performance-sensitive paths affect analyzed performance traces. Such behavior descriptors may similarly be added to behavior descriptors database 106.

Thereafter, a trace analysis tool may be used to automatically determine which of the traces in the set of performance traces being processed reveals the behavior represented by the behavior descriptor by attempting to match the behavior descriptor to each of the traces in the set. Any of a number of trace analysis tools may be used in the course of processing a set of performance traces. The specific tools used and the behavior descriptors accessed by those tools may depend on the analysis task being performed. For example, a trace analysis tool may access behavior descriptors corresponding to known performance issues. Such a tool may apply those behavior descriptors to identify and filter from a set of performance traces those traces corresponding to known performance issues to leave a smaller set of performance traces, corresponding to potentially unknown performance issues, for human analysis. As another example, a behavior descriptor may correspond to a behavior that has been observed in connection with multiple error reports but for which an underlying cause has not been identified. A tool may use such a behavior descriptor to collect from a set of performance traces a smaller set of traces that each exhibits that behavior. This smaller set may then be further analyzed, possibly manually, to attempt to identify the cause of that performance issue. As yet another example, a trace analysis tool may count traces within a set exhibiting behaviors associated with performance issues as a way to determine the frequency of occurrence of that performance issue. This information may be used, for example, in allocating resources to resolve performance issues such that issues that occur more frequently are given higher priority in resource allocation. Accordingly, it should be appreciated that, while FIG. 1 shows a single trace analysis tool, different tools may be used at different times during analysis.

Trace analysis tool 102 may be executed in any suitable manner. For example, user input from a user such as a performance analyst may be received to start operation of trace analysis tool 102. Such input may specify, for example, the behavior descriptors of interest to the analyst. Such input may identify the behavior descriptors individually or by characteristics, such as those associated with known performance issues or relating to a particular type of behavior or a particular process.

Once the tool is run, the output of the tool may be used in any suitable way. In some embodiments, results of application of a plurality of behavior descriptors from behavior descriptors database 106 to performance traces in trace database 104 by trace analysis tool 102 may be provided as matching reports 112 shown in FIG. 1. Matching reports 112 may be presented to a user on a display 110 which may be any suitable display device configured to provide a user interface. Matching reports 112 may comprise information on each behavior descriptor that matches an analyzed performance trace. Thus, attributes of the behavior descriptors and associated values may be presented in the reports. The attributes may be presented to a user in a manner that allows the user to readily appreciate this information and to thus address an underlying issue effectively.

Behavior patterns identified in a performance trace using trace analysis tool 102 may be indicative of issues that may need to be addressed. The issues may relate to any problem that may occur when a computer system operates. Thus, the issues may relate to execution of an application, to system service, thread interference, resource (e.g., memory or CPU) exhaustion, network delay and many others. Behavior descriptors of different categories may be used to identify respective different issues. In some embodiments, all or part of behavior descriptors in behavior descriptors database 106 may be associated with information describing issues identified using behavior descriptors and/or with information on assessment of the issues. Such assessment information may describe a severity of an impact of the issues on overall performance of the computer system, a frequency of occurrence of the issue in a performance trace or among multiple performance traces, whether the issue is complex (i.e., depends on other issues or causes other issues), etc.

In some embodiments, system 100 may provide a way to identify solution(s) to the issues that may be identified using the behavior descriptors. Thus, in the example illustrated, system 100 may comprise a problem solving database 114 which may include information on how issues identified using the behavior descriptors may be addressed. To identify a proper solution to a detected issue, a behavior descriptor used to detect the issue may be associated with an identifier that allows locating a solution to this issue in a problem solving database 114. Thus, matching reports 112 may present information on both a detected issue and its suggested solution.

As shown in FIG. 1, trace analysis tool 102, behavior descriptors generation interface 108 and any other components in FIG. 1 may be executed by one or more processors 116. Processors 116 may be any suitable processors.

Figure 2:
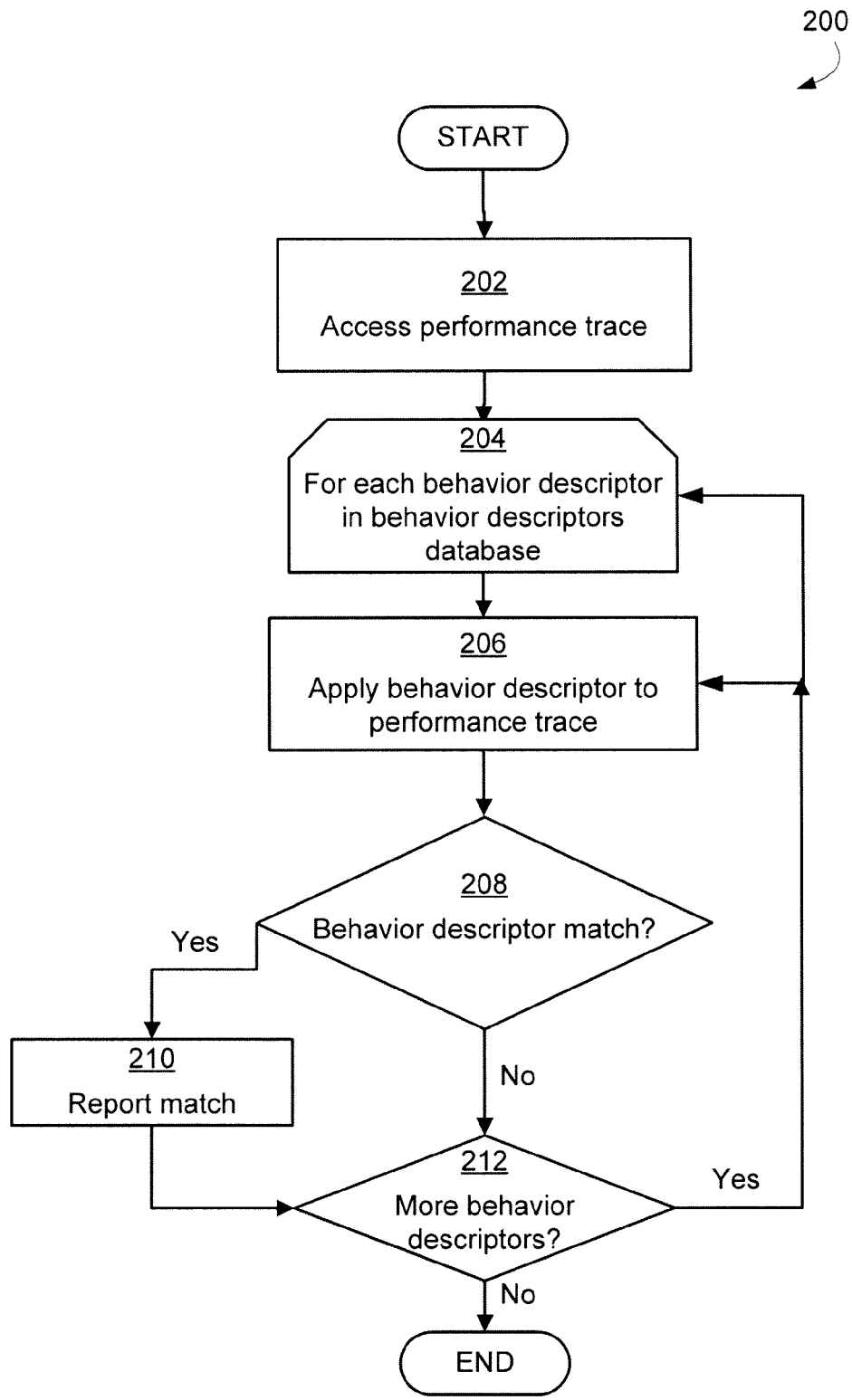
FIG. 2 is a flowchart illustrating a process of analyzing a performance trace using a plurality of behavior descriptors, in accordance with some embodiments of the invention.

FIG. 2 illustrates a process 200 of analyzing a performance trace by the trace analysis tool, using a plurality of behavior descriptors. Process 200 may start at any suitable time. For example, process 200 may start when execution of the trace analysis tool is initiated, which may be done in any suitable way and in response to any suitable trigger. For example, a user input may be received to initiate the trace analysis tool or the trace analysis tool may be initiated automatically. It should be appreciated that FIG. 2 shows analysis of a single performance trace. In some embodiments, the process of FIG. 2 may be repeated for each trace in a set being analyzed. Furthermore, in some embodiments, portions of the performance trace may be analyzed. The performance trace may comprise events (e.g., a sequence of events). Accordingly, process 200 may analyze one or more events in the performance trace. In such scenarios, process 200 may be repeated for each event being analyzed.

As shown in FIG. 2, at block 202, process 200 may access a performance trace. The performance trace may be received from a suitable storage, such as trace database 104 (FIG. 1). To analyze the performance trace, the trace analysis tool may apply behavior descriptors to the performance trace. For example, all of the behavior descriptors stored in a suitable storage (e.g., behavior descriptors database 106 in FIG. 1) may be utilized. In some scenarios, a subset of behavior descriptors from behavior descriptors database 106 or other collection of behavior descriptors may be utilized as embodiments of the invention are not limited in this respect.

Further, in some embodiments, some a priori knowledge about the performance trace may be utilized to select a plurality of behavior descriptors to analyze the performance trace. For example, if information is available indicating that certain behavior patterns may be detected within the performance trace or that only certain behaviors are of interest, behaviors descriptors to be matched to the performance trace may be selected accordingly.

Also, it may be desirable to identify a behavior of a certain category (e.g., CPU consumption, disk I/O, network delay, device I/O, etc.) within the performance trace. Accordingly, behavior descriptor(s) that describe such behavior may be selected to analyze the performance trace.

Block 204 in FIG. 2 illustrates that each behavior descriptor from the behavior descriptors database or other suitable collection may be applied to the performance trace. At block 206, a behavior descriptor may be applied to the performance trace, meaning that the behavior descriptor is compared with the performance trace to determine whether the performance trace comprises indicators of behavior that is described by the behavior descriptor. In some scenarios, at block 206, the behavior descriptor may be applied to an event in the performance trace to determine whether the event comprises an indicator of the behavior that is described by the behavior descriptor. Behavior descriptor database 106 (FIG. 1) may be accessed to obtain the behavior descriptor. Though, the behavior descriptor may be obtained from any other suitable source.

If the performance trace or an event in the performance trace contains information matching each of the values of the attributes representing a state of a computer system specified for a behavior descriptor, this may manifest a "match" between the performance trace and the behavior descriptor. For example, the attributes specified for a behavior descriptor may include a process name, a thread starting function, one or more functions in the stack, a sequence of events such as an indication of a start and end of an operation or file names in disk I/O. Values of these same attributes may be captured in a performance trace and compared to corresponding values in the behavior descriptor to determine whether there is a match. It should be appreciated that behavior associated with any suitable stacks may be identified using behavior descriptors, such as, for example, stacks on CPU usage, stacks on a thread which wakes up another thread, stacks on a thread which is awakened by another thread, stacks on the I/O and any other suitable stacks.

Next, at block 208, the process may branch, depending on whether the behavior descriptor matches the performance trace. If the match is detected, process 200 continues to block 210, where the match may be reported. Reporting the match may include any suitable process of informing a user that the performance trace comprises an indication of the behavior described by the behavior descriptor. For example, the match may be reported to the user by displaying related information on a display. Though, other ways of informing the user of the match may be utilized. The information on the match may comprise description of the behavior in a user-friendly manner, a level of impact of the behavior on the performance trace and other information. In some embodiments, when the behavior is indicative of a performance issue which may need to be fixed, the information may comprise one or more solutions applicable to fix the performance issue.

After the match has been reported at block 210 process 200 may continue to block 212 where it may be determined whether more behavior descriptors are available to be compared to the performance trace. This may be determined in any suitable manner. For example, the behavior descriptors database or other suitable storage of the behavior descriptors may be accessed to determine whether one or more other behavior descriptors may be applied to the performance trace.

When it is determined at block 212 that one or more behavior descriptors are available for analysis of the performance trace, process 200 may return to block 206 where another behavior descriptor may be applied to the performance trace and process 200 as described above repeats. When it is determined at block 212 that no other behavior descriptors are available for analysis of the performance trace, process 200 may end.

It should be appreciated that FIG. 2 illustrates a scenario in which the result of analysis is a report. In embodiments in which matching is used to include or exclude a performance trace from a set or to perform other conditional processing, that conditional processing may be performed at block 210 instead of or in addition to reporting.

When it is determined at block 208 that the behavior descriptor does not match the performance trace, process 200 may branch to block 212 where it may be determined whether more behavior descriptors are available to be compared to the performance trace. In scenarios where the behavior descriptor is compared to an event in the performance trace, it may be determined at block 212 whether more behavior descriptors are available to be compared to this event. When it is determined at block 212 that one or more behavior descriptors are available for analysis of the performance trace, process 200 may return to block 206. When it is determined at block 212 that no other behavior descriptors are available for analysis of the performance trace, process 200 may end.

Behavior descriptors and an order of their application to the performance trace may be selected in any suitable manner. For example, more general behavior descriptors may be applied first and, after corresponding behavior is recognized within the performance trace, behavior descriptors describing the behavior with more specificity or other relevant behavior descriptors may be applied. Also, behavior descriptors that describe behaviors that may affect a critical path within the performance trace may be applied to the performance trace first, after which behavior descriptors describing background activity, such as resource usage, may be utilized.

Process 200 illustrated in FIG. 2 may be described as an application of a "basic" behavior descriptor to a performance trace. A behavior descriptor may be referred to as basic when it describes certain behavior indicative of an issue that can be identified using the behavior descriptor. In contrast, a behavior descriptor may be "compound," meaning that it describes behavior indicative of a component of a more complex issue—i.e., to identify such issue, more than one other behavior descriptor may be used. Thus, a compound behavior descriptor may comprise two or more behavior descriptors, which may be basic or also compound behavior descriptors. Each compound behavior descriptor may represent a combination of issues within a certain category.

Compound behavior descriptors may comprise a description of interactions between other behavior descriptors to describe, in combination, a certain behavior. The complex behavior may be defined by relating two or more behavior descriptors to each other in a suitable manner. In some scenarios, behavior descriptors of a compound behavior descriptor may relate to each other in a hierarchical manner such that one descriptor corresponds to a behavior that is more generic and another behavior descriptor corresponds to a more specific behavior. As a specific example, a behavior indicated by a more generic behavior descriptor may be that a thread is waiting. A more specific behavior descriptor may correspond to a more specific behavior may indicate more specifically what is being waited, providing a lower level of detail in the hierarchy. Accordingly, in some embodiments, hierarchical relationships between two or more behavior descriptors may be determined. Other types of interactions between behavior descriptors may alternatively or additionally be defined in a compound behavior descriptor. Such interactions may be, for example, of a type when a first behavior descriptor matches a first thread that is waiting on a second thread that matches a second behavior descriptor. Thus, in such relationships, the first behavior descriptor may be waiting on the second behavior descriptor.

As another type of relationship between more than one behavior descriptors, a first behavior descriptor may match a component in a call stack that calls another component in the call stack that matches a second behavior descriptor. This relationship may be indicative of a caller/callee relationship between the first behavior descriptor and the second behavior descriptor, meaning that the first behavior descriptor calls the second behavior descriptor. For example, the first behavior descriptor may describe a CPU consumption during a tab creation (e.g., a tab creation in Microsoft Internet Explorer®) and the second behavior descriptor may describe a CPU consumption while loading browser helper objects during the tab creation. Such relationship may be represented as a compound behavior descriptor in a "CPU consumption" category.

A compound behavior descriptor may also comprise two or more behavior descriptors of a different scope. In such scenarios, a first behavior descriptor may be a superset of a second behavior descriptor. For example, the first behavior descriptor may describe a "general disk activity" behavior, whereas the second behavior descriptor may describe the same behavior with more specificity—e.g., "a disk activity to file X." In some scenarios, behavior descriptors may not necessarily relate to each other so that one is entirely within the scope of another. Thus, the behavior descriptors may overlap.

Figure 3:
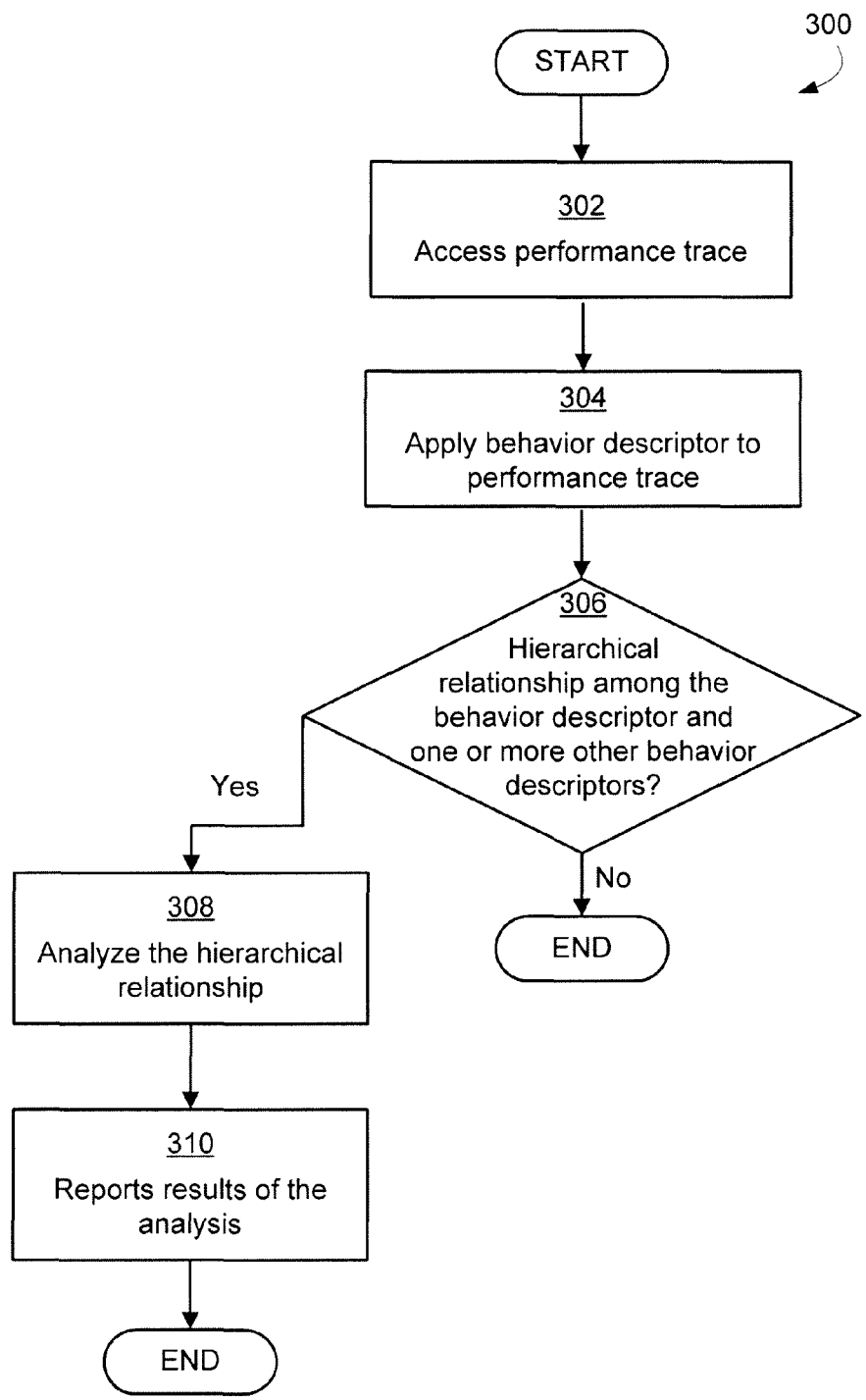
FIG. 3 is a flowchart illustrating a process of identifying interaction between behavior descriptors, in accordance with some embodiments of the invention.

FIG. 3 illustrates a process 300 of identifying a hierarchical relationship between behavior descriptors, in accordance with some embodiments of the invention. Process 300 may start at any suitable time. For example, similarly to process 200 shown in FIG. 2, process 300 may start when trace analysis tool 102 is initiated. Though, it should be appreciated that process 300 may start at any suitable time. At block 302, process 300 may access a performance trace. As discussed above, the performance trace may be stored in a suitable storage such as a trace database 104.

Next, at block 304, simple behavior descriptors may be compared to the performance trace. It may then be determined, at block 306, whether a hierarchical relationship exists among the behavior descriptors that match the trace.

At block 306, compound behavior descriptors may be analyzed. Such analysis may entail determining whether simple behavior descriptors matching the performance trace meet the criteria of a compound behavior descriptor. In this example, the compound behavior descriptors specify a hierarchical relationship between simple behavior descriptors. When the hierarchical relationship between the behavior descriptors is identified at block 306, process 300 may branch to block 308.

As schematically illustrated by block 308, the identified hierarchical relationship may be analyzed meaning that a nature of the hierarchical relationship is determined. It should be appreciated that processing at blocks 308 is shown in this order by way of example only as analyzing the identified hierarchical relationship may be performed prior to or concurrently with reporting the hierarchical relationship. Analysis may include any suitable analysis, including analysis as described above in connection with simple behavior descriptors.

At block 310, the identified hierarchical relationship may be reported or other processing based on identifying a compound behavior may be performed. The reporting may generally involve a process of informing a user of the identified hierarchical relationship. For example, the reporting may involve generating and displaying matching reports 112.

It should be appreciated that compound behavior descriptors relate two or more simple behavior descriptors. It should be appreciated, though, that compound descriptors may involve any two or more behavior descriptors, even other compound behavior descriptors.

Figure 4:
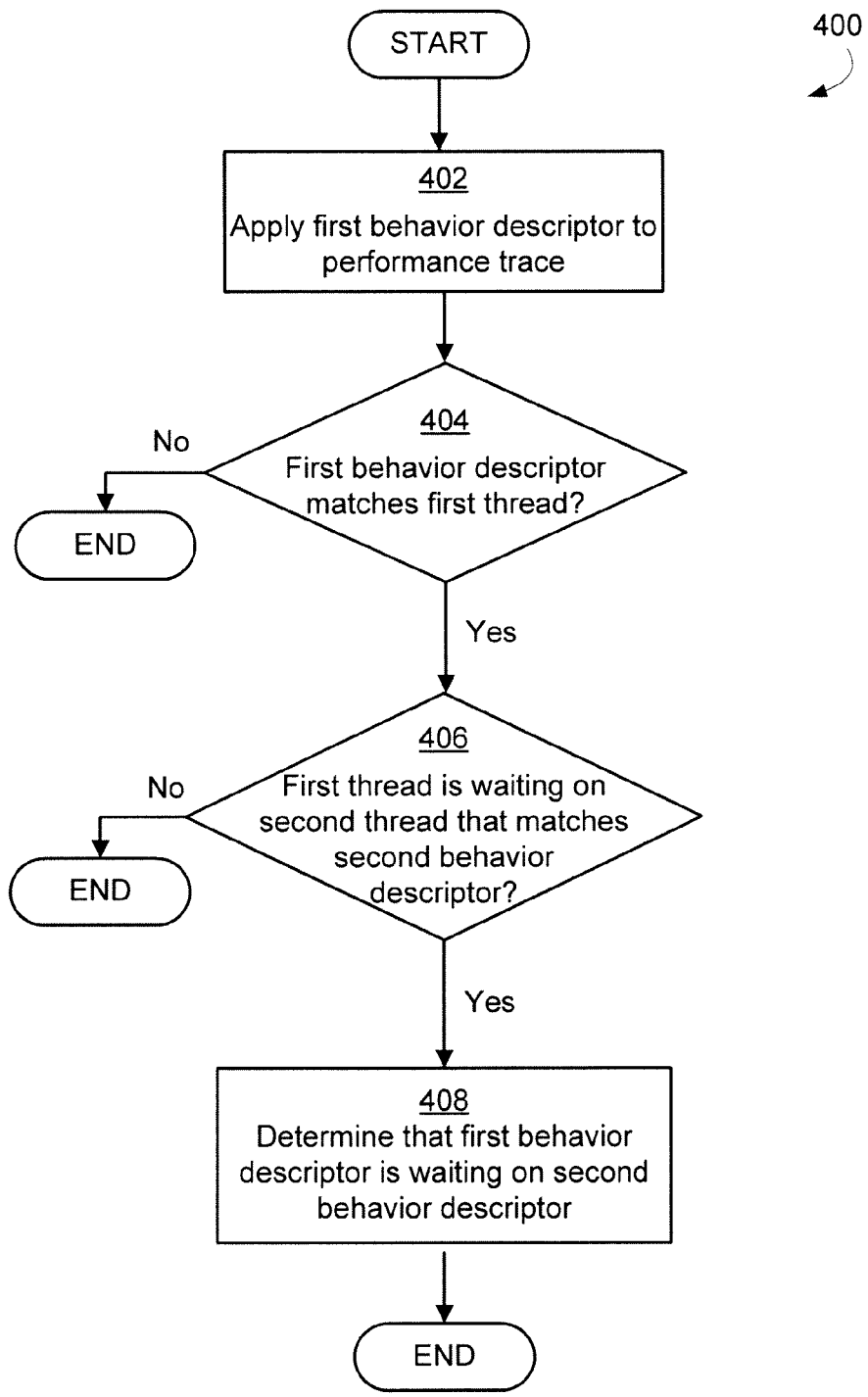
FIG. 4 is a flowchart illustrating a process of determining a first type of interaction between behavior descriptors wherein one behavior descriptor is waiting on another behavior descriptor, in accordance with some embodiments of the invention.
Figure 5:
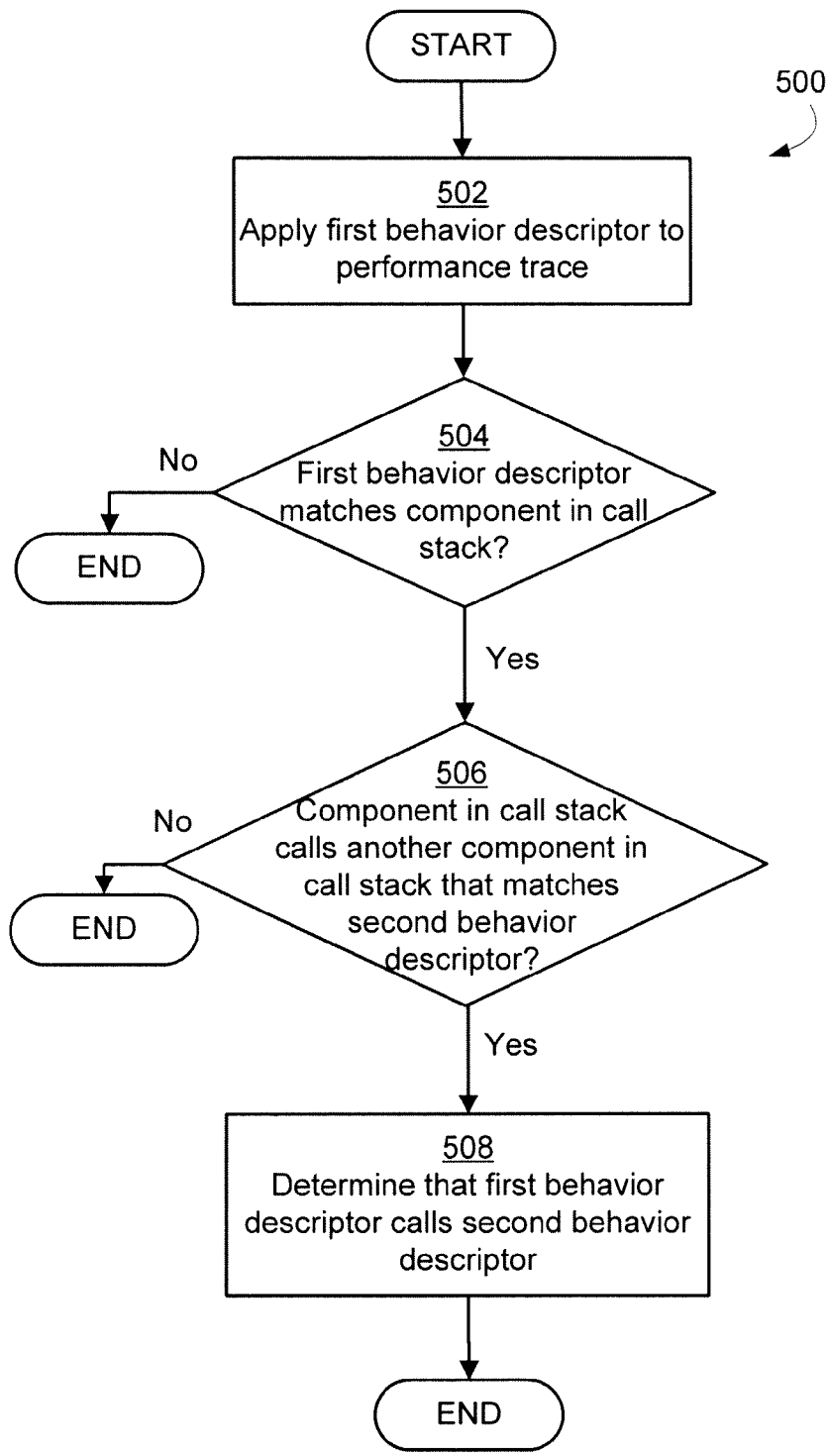
FIG. 5 is a flowchart illustrating a process of determining a second type of interaction between behavior descriptors wherein one behavior descriptor calls another behavior descriptor, in accordance with some embodiments of the invention.
Figure 6:
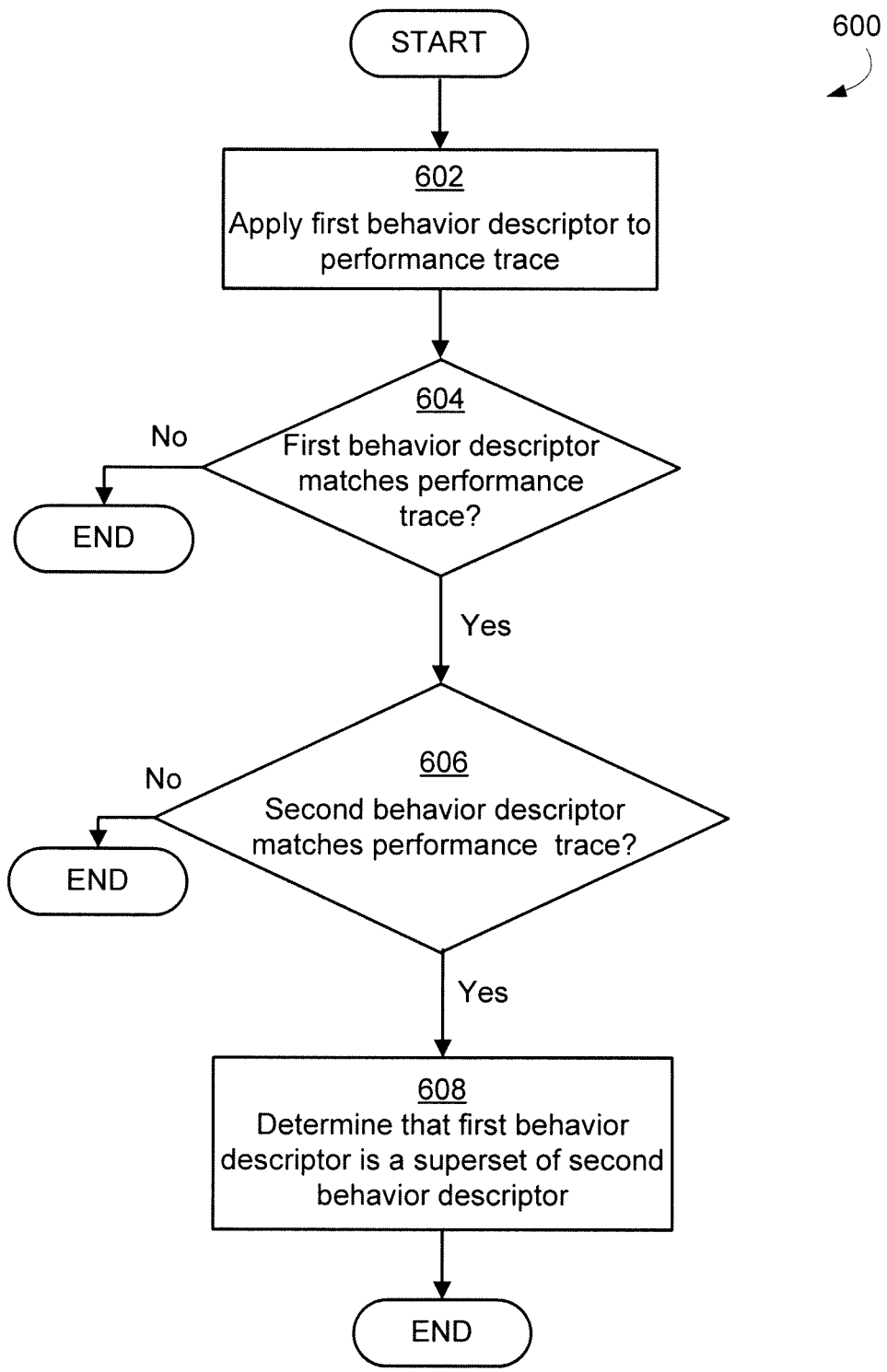
FIG. 6 is a flowchart illustrating a process of determining a third type of interaction between behavior descriptors wherein one behavior descriptor is a superset of another behavior descriptor, in accordance with some embodiments of the invention.

FIGS. 4-6 illustrate examples of other types of relationships between behavior descriptors that may be detected using techniques in accordance with some embodiments. In FIGS. 4-6, each of the respective illustrated processes may be started at any suitable time and may then access a performance trace to be analyzed. Accordingly, these steps are not described in detail in connection with FIGS. 4-6 for simplicity of description. Each of the processes illustrated in FIGS. 4-6 may utilize trace analysis tool 102 to analyze a performance trace obtained from trace database 104 by comparing the performance trace with a behavior descriptor obtained from behavior descriptors database 106.

FIG. 4 illustrates a process 400 of determining a relationship between behavior descriptors wherein one behavior descriptor is waiting on another behavior descriptor. It should be appreciated that a behavior descriptor is considered to be "waiting" on another behavior descriptor in a sense that the waiting descriptor and the descriptor on which the waiting descriptor is waiting together describe a compound behavior within a performance trace in which one thread, that matches one behavior descriptor, is waiting on another that matches another behavior descriptor.

At block 402, a behavior descriptor may be applied to the performance trace so that the behavior descriptor is compared to the performance trace. Next, at decision block 404, it may be determined whether the behavior descriptor matches a first thread within the performance trace. If it is determined, at decision block 404, that the behavior descriptor matches the first thread, process 400 may end.

If it is determined, at decision block 404, that the behavior descriptor matches the first thread, process 400 may continue to decision block 406, where it may be determined whether the first thread is waiting on a second thread that matches another, second, behavior descriptor. If it is determined, at decision block 406, that the first thread is not waiting on the second thread that matches the second behavior descriptor, process 400 may end. It should be appreciated that techniques are known in the art for determining, from a performance trace, whether one thread is waiting on another. Though, any suitable techniques may be used.

If it is determined, at decision block 406, that the first thread is waiting on the second thread that matches the second behavior descriptor, process 400 may then continue to block 408, where it may be determined that the first behavior descriptor is waiting on the second behavior descriptor. It should be appreciated that even though respective processing at blocks 404 and 406 is shown as two blocks, the processing at blocks 404 and 406 may be performed as one step.

The thus identified compound behavior descriptor, identified by the relationship between the first and second behavior descriptors, may then be assessed in a suitable manner. For example, a user may determine a performance issue associated with one thread waiting on another. An impact of the wait on performance of the computer system may be determined and a related decision on fixing the performance issue may be made. Process 400 may then end. Though, it should be appreciated that process 400 may be a continuous process. Thus, process 400 may continue applying other behavior descriptors to the same or other performance traces to reveal another hierarchical relationship wherein one behavior descriptor is waiting on another.

Also, process 400 may be a part of process 200 shown in FIG. 2. For example, process 400 may be performed during processing at block 208 of FIG. 2 where it is determined whether a behavior descriptor matches a performance trace being analyzed. The matching process may reveal that the behavior descriptor describes a behavior that is part of a more complex behavior pattern.

FIG. 5 illustrates a process 500 of determining a relationship between behavior descriptors wherein one behavior descriptor calls another behavior descriptor. At block 502, a behavior descriptor may be applied to the performance trace so that the behavior descriptor is compared to the performance trace. Next, at decision block 504, it may be determined whether the behavior descriptor matches a component in a call stack. If this is not the case, process 500 may end.

If it is determined, at decision block 504, that the behavior descriptor matches the component in the call stack, process 500 may branch to decision block 506 where it may be next determined whether the component in the call stack calls another component in the call stack that matches a second behavior descriptor. This may determine whether the call stack comprises a component that calls another component and the components therefore relate to each other in what is referred to as a caller/callee relationship. The component may be any suitable entity. For example, the component may be a function within a module that is calling another function within the same module. It should be appreciated that even though respective processing at blocks 504 and 506 is shown as two blocks, the processing at blocks 504 and 506 may be performed as a single step.

Accordingly, if it is determined, at decision block 506, that the component in the call stack calls another component in the call stack that matches the second behavior descriptor, process 500 may continue to block 508, where it may be determined that the first behavior descriptor calls the second behavior descriptor. Process 500 may then end. Alternatively, process 500 may end when it is determined, at decision block 506, that the component in the call stack does not call another component in the call stack that matches the second behavior descriptor.

FIG. 6 is illustrates another example of determining a relationship between behavior descriptors wherein one behavior descriptor is a superset of another behavior descriptor. In FIG. 6, process 600, after being started in a suitable manner, may continue at block 602 where a first behavior descriptor may be applied to a performance trace so that the behavior descriptor is compared to the performance trace. Thus, at decision block 604, it may be determined whether the first behavior descriptor matches the performance trace. If this is not the case, process 600 may end.

If it is determined, at decision block 604, that the behavior descriptor matches the performance trace, process 600 may branch to decision block 606 where it may be determined whether another, second, behavior descriptor also matches the performance trace. The second behavior descriptor may be of a smaller scope than the first behavior descriptor, where the scope may be defined in terms of a specificity of identification of the underlying behavior. Thus, the first behavior descriptor may be more general than the second. For example, the first behavior descriptor may be a generic "Any Disk I/O" descriptor, the second behavior descriptor may be a "MSN Messenger Reads Icons from Disk" descriptor.

If it is determined, at decision block 606, that the second behavior descriptor matches the performance trace, process may proceed to block 608 where it may be identified that the first behavior descriptor is a superset of the second behavior descriptor. If the match between the second behavior descriptor and the performance trace is not determined, process 600 may end.

It should be appreciated that even though FIG. 6 illustrates determining the relationship between two behavior descriptors, such relationship may be identified among more than two behavior descriptors. In other words, multiple behavior descriptors may form a direct or indirect dependency chain thus describing a complex behavior within a performance trace. Referring to the above example, in such scenarios, when the first behavior descriptor is "Any Disk I/O" descriptor, the second behavior descriptor that is a subset of the first behavior descriptor may be a "Any Disk Read" descriptor. Further, a third behavior descriptor may describe a "MSN Messenger Reads Icons from Disk" behavior and this behavior descriptor may be, in turn, a subset of both the first and second behavior descriptors. Thus, these three behavior descriptors may be in a three-level deep subset/superset hierarchy.

Furthermore, it should be appreciated that behavior descriptors may relate to each other in any suitable manner as embodiments of the invention are not limited in this respect. Thus, in some embodiments, a behavior descriptor may not be a superset of another behavior descriptor but the behavior descriptors may overlap to a certain degree. Any other relationships between behavior descriptors may be implemented.

In some embodiments, behavior descriptors referred to as cross-category behavior descriptors may be utilized. A cross-category behavior descriptor may represent a combination of behaviors across different categories. For example, a behavior descriptor "X" may describe all wait operations during a tab creation (e.g., a tab creation in Microsoft Internet Explorer®), a behavior descriptor "Y" may describe wait operations on a specific resource lock within the tab creation, and a behavior descriptor "Z" may describe a CPU consumption while holding this specific resource lock. In this example, behavior descriptors "X" and "Y" have a caller/callee relationship, whereas behavior descriptor "Y" may wait on behavior descriptor "Z." A cross-category behavior descriptor my be defined to include the behavior descriptors "X," "Y," and "Z" in order to measure an impact of a path described by these descriptors (i.e. "X" calls "Y" which waits on "Z") across any suitable performance trace(s).

Figure 7:
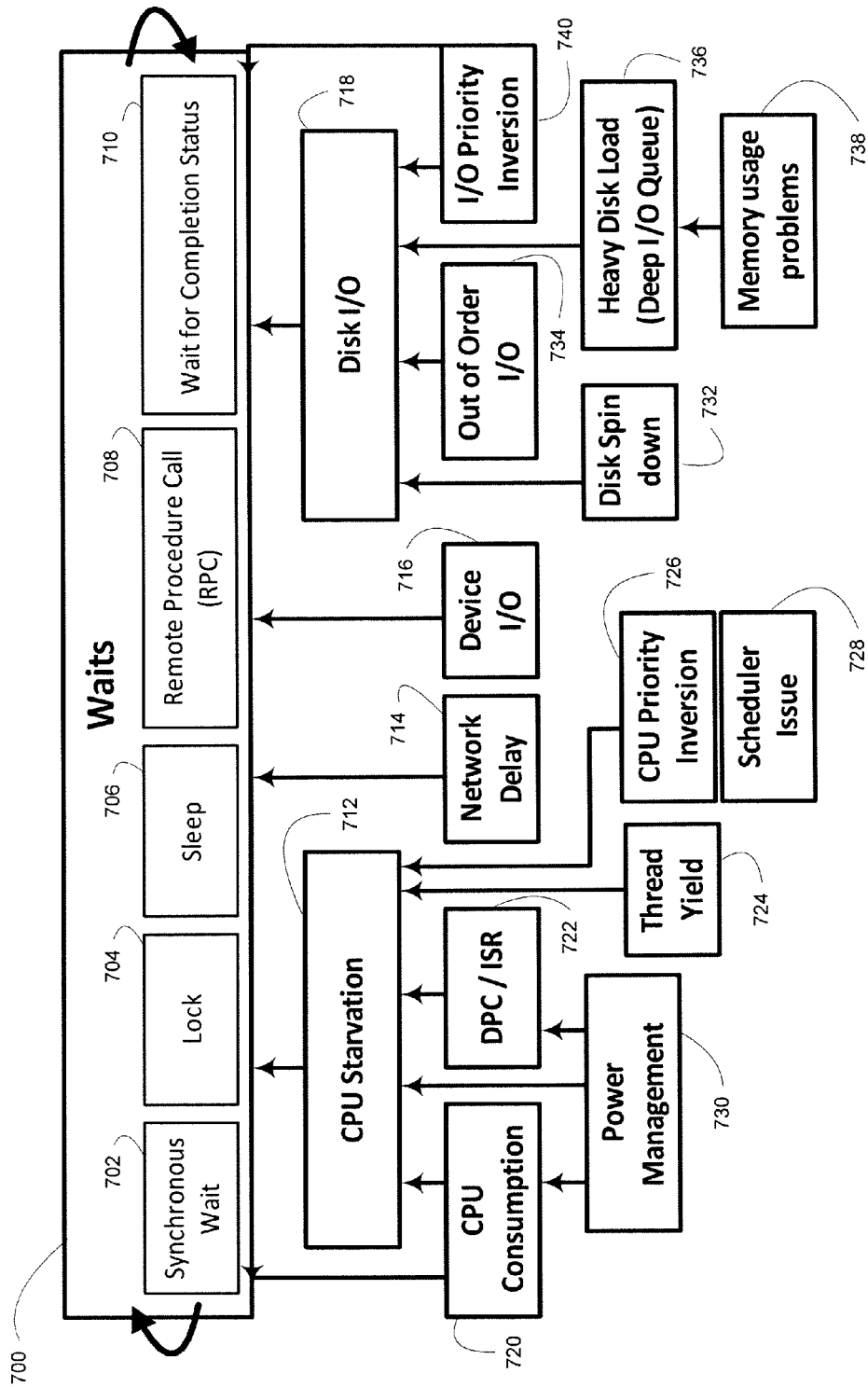
FIG. 7 is a block diagram illustrating hierarchical relationships among behavior descriptors, in accordance with some embodiments of the invention.

The description language provided in some embodiments of the invention to describe behavior within performance traces using behavior descriptors may be used to define behavior descriptors of multiple categories. Values of attributes associated with each behavior descriptor may indicate a category or categories associated with a behavior descriptor. FIG. 7 illustrates such exemplary categories. In FIG. 7, each arrow originates at a behavior descriptor that represents a class of problems which may be a subset of a class of problems described by a behavior descriptor at which the arrow points, revealing a hierarchical relationship between categories, which may also be used to define a corresponding hierarchical relationship between behavior descriptors in those categories. Alternatively or additionally, an arrow may represent that a behavior descriptor describes a behavior exacerbating behavior described by another behavior descriptor.

FIG. 7 shows that a broad category of behavior descriptors may describe performance issues 700 collectively referred to as "waits." The waits performance issues may comprise, by way of example, synchronous wait 702, lock 704, sleep 706, remote procedure call (RPC) 708 and wait for completion status 710.

The waits performance issues may be caused by a variety of other issues each of which, either alone or in combination with other issues, may cause a wait. FIG. 7 illustrates a hierarchy of such issues which may be represented by behavior descriptors describing respective behaviors. Thus, CPU starvation 712, network delay 714, device I/O 716 and disk I/O 718 are behavior descriptors describing respective behaviors that may directly cause different waits. From these behavior descriptors, CPU starvation 712 and disk I/O 718 may be a result of different causes. For example, CPU starvation 712 may be caused by a CPU consumption 720, a deferred procedure call (DPC)/interrupt service routines (ISR) 722, a thread yield 724, and a combination of CPU priority inversion 726 and a scheduler issue 728. As shown in FIG. 7, both of CPU consumption 720 and DPC/ISR 722 may be affected by issues related to power management 730 which may also directly cause CPU starvation 712.

Performance issue which may be identified using disk I/O behavior descriptor 718 may be caused or exacerbated by disk spin down 732, out of order I/O 734, heavy disk load (deep I/O queue) 736 which may be caused by memory usage problems 738, and by I/O priority inversion 740. It should be appreciated that any other dependencies among behavior descriptors may exist.

Figure 8:
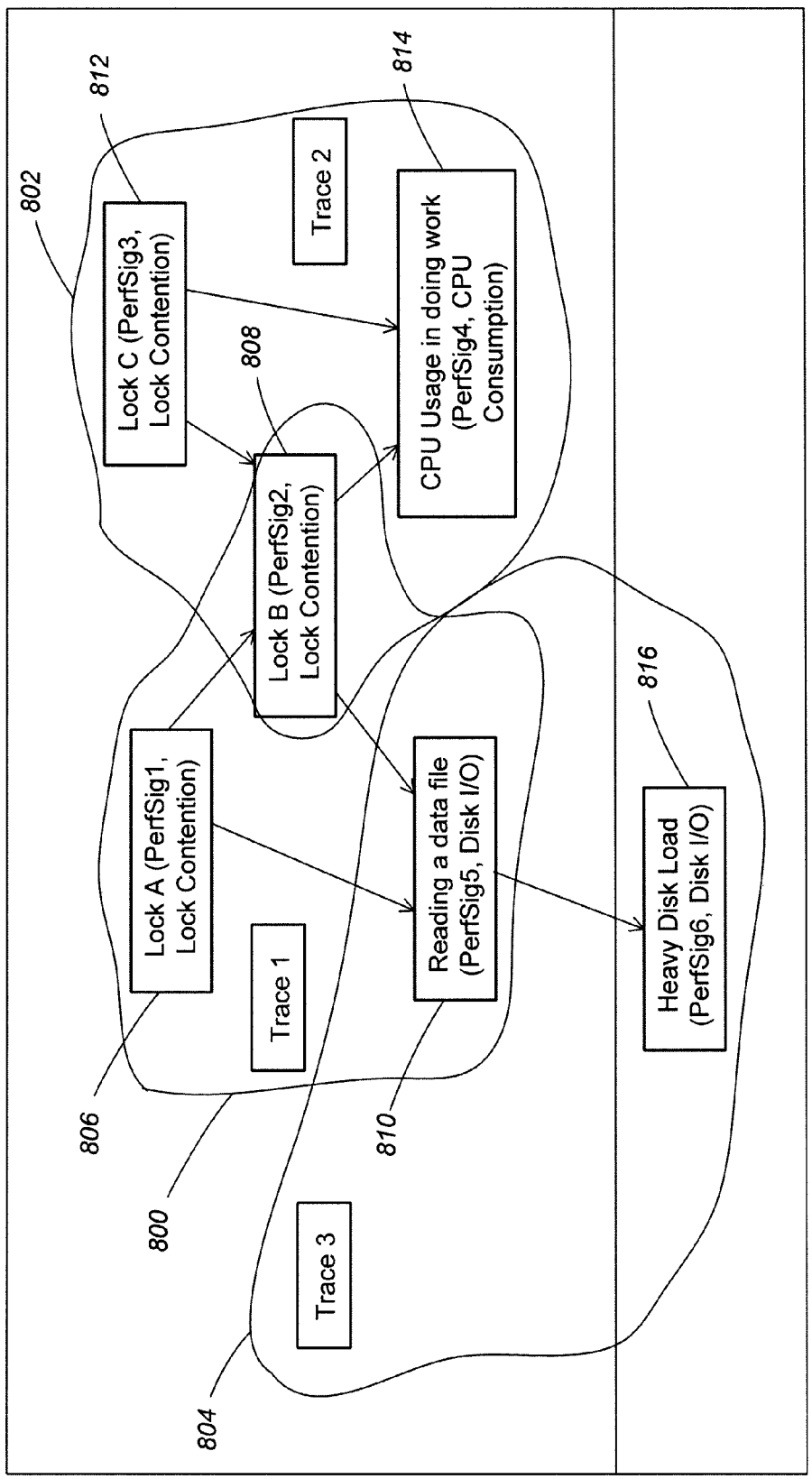
FIG. 8 illustrates an example of interactions between behavior descriptors matched to multiple performance traces.

FIG. 8 illustrates an example of relationships among behavior descriptors matched to multiple performance traces such that that analysis based on performance descriptors may simplify identification of underlying root causes that are manifested as different performance issues. FIG. 8 represents conceptually how such analysis may be performed. In this example, Trace 1 is labeled with a numerical reference 800, Trace 2 is labeled with a numerical reference 802, and Trace 3 is labeled with a numerical reference 804. Behavior descriptors that were matched with these performance traces are schematically shown within respective traces and the dependencies between the behavior descriptors are shown by arrows. Analysis of the behavior descriptors as shown in FIG. 8 may allow identifying dependencies among performance issues which may, in turn, help prioritizing a process of addressing (e.g., fixing) the performance issues.

Trace 1 has been matched to behavior descriptor 806, called PerfSig1, which is indicated to be dependent on behavior descriptor 808, called PerfSig2, and also behavior descriptor 810, called PerfSig5. PerfSig2 is dependent on PerfSig5 in Trace 1. In this example, PerfSig1 indicates a behavior characterized by lock contention such that Trace 1 is waiting on Lock A. PerfSig5 indicates a behavior characterized by a thread waiting for Disk I/O.

Further, Trace 2 also matches PerfSig2 and additionally matches behavior descriptor 812, PerfSig3, and PerfSig4 behavior descriptor 814. In this example, PerfSig3 represents a behavior of a trace waiting on Lock C. PerfSig4 represents a behavior characterized by heavy CPU consumption. PerfSig3, in this example, is dependent on behavior descriptor 808 PerfSig2 and PerfSig4 behavior descriptor 814. In Trace 2, PerfSig2 is additionally dependent on PerfSig4.

Trace 3, as well as Trace 1, matches PerfSig5 behavior descriptor 810. In addition, Trace 3 matches PerfSig6 behavior descriptor 816. Such a behavior descriptor may indicate a behavior caused by a thread delayed as a result of heavy disk I/O described by "heavy disk I/O."

In this example, each of the traces may represent a performance issue. Analysis showing relationships between behavior descriptors may reveal root causes of performance issues or may identify underlying behaviors, which, if corrected, could have a significant impact on performance. For example, FIG. 8 shows commonality among the behavior descriptors that may highlight an issue, which, if addressed, would potentially resolve multiple performance issues.

For example, PerfSig1 and PerfSig3 both depend on PerfSig2, which indicates tasks blocked waiting on "Lock B." Accordingly, fixing a performance issue related to "Lock B" may address respective performance issues reflected in both Traces 1 and 2, such that addressing a bug or other problem that caused the traces to be waiting on Lock B may have a significant impact.

Though, the analysis may be extended to identify possible underlying causes of the behavior represented by behavior descriptor PerfSig2, to alleviate undesirable consequences caused by "Lock B." As can be seen, PerfSig2 depends on PerfSig5, indicating a problem associated with reading a data file, as represented by behavior descriptor 810, such that resources may be beneficially allocated to modifying software to avoid that behavior. In addition, FIG. 8 also indicates that PerSig2 depends on PerfSig4. Accordingly, it may be possible to address performance issues by removing the behavior associated with excessive CPU usage represented by PerfSig4 behavior descriptor 814.

Though, the scenario illustrated in FIG. 8 further shows that PerfSig5 depends in turn on PerfSig6. Accordingly, analysis as represented by FIG. 8 may reveal that multiple performance issues can be addressed by modifying software that gives rise to the behavior represented by behavior descriptor 816.

In some embodiments, decisions regarding addressing the performance issues may be taken based on severity of impact of the issue on an overall performance of the computer system, time- and labor-related expenditures required to address the issues and any other suitable factors. As discussed above, a behavior descriptor may be defined such that information on addressing respective issues may be obtained when the behavior descriptor matches a performance trace. Such information may be obtained, for example, from the behavior descriptor itself or from a suitable storage medium (e.g., problem solving database 114 in FIG. 1). This information may then be used in addressing the performance issues identified and presented to a use in any suitable manner, such as, for example, displayed on a display as shown in FIG. 8. It should be appreciated that a user of trace analysis tool 102 (FIG. 1) or other suitable tool for analyzing traces implemented in accordance with some embodiments of the invention may manually analyze results of application of behavior descriptors to performance traces.

As described above, the description language in accordance with some embodiments of the invention may be used to define behavior descriptors in a predetermined manner, using a standard representation. Thus, the description language allows users (e.g., developers, performance analysts or any other users) to define behavior descriptors using a format provided by the language. In some embodiments, the language may be based on an XML schema. Though, embodiments are not limited in this respect and other languages may be substituted.

Equipping a user with such standardized way to define behavior descriptors simplifies a task of describing a behavior described in a behavior descriptor thus saving labor, resources and time, and improving overall user experience. Moreover, the thus defined behavior descriptor may be used to detect the behavior in any suitable trace, which decreases redundancy in analysis of performance traces.

In some embodiments, each behavior descriptor may comprise a plurality of attributes. Accordingly, generating a behavior descriptor may involve receiving user input indicative of values of one or more of the plurality of attributes. Behavior descriptors of different categories may have different attributes.

Figure 9:
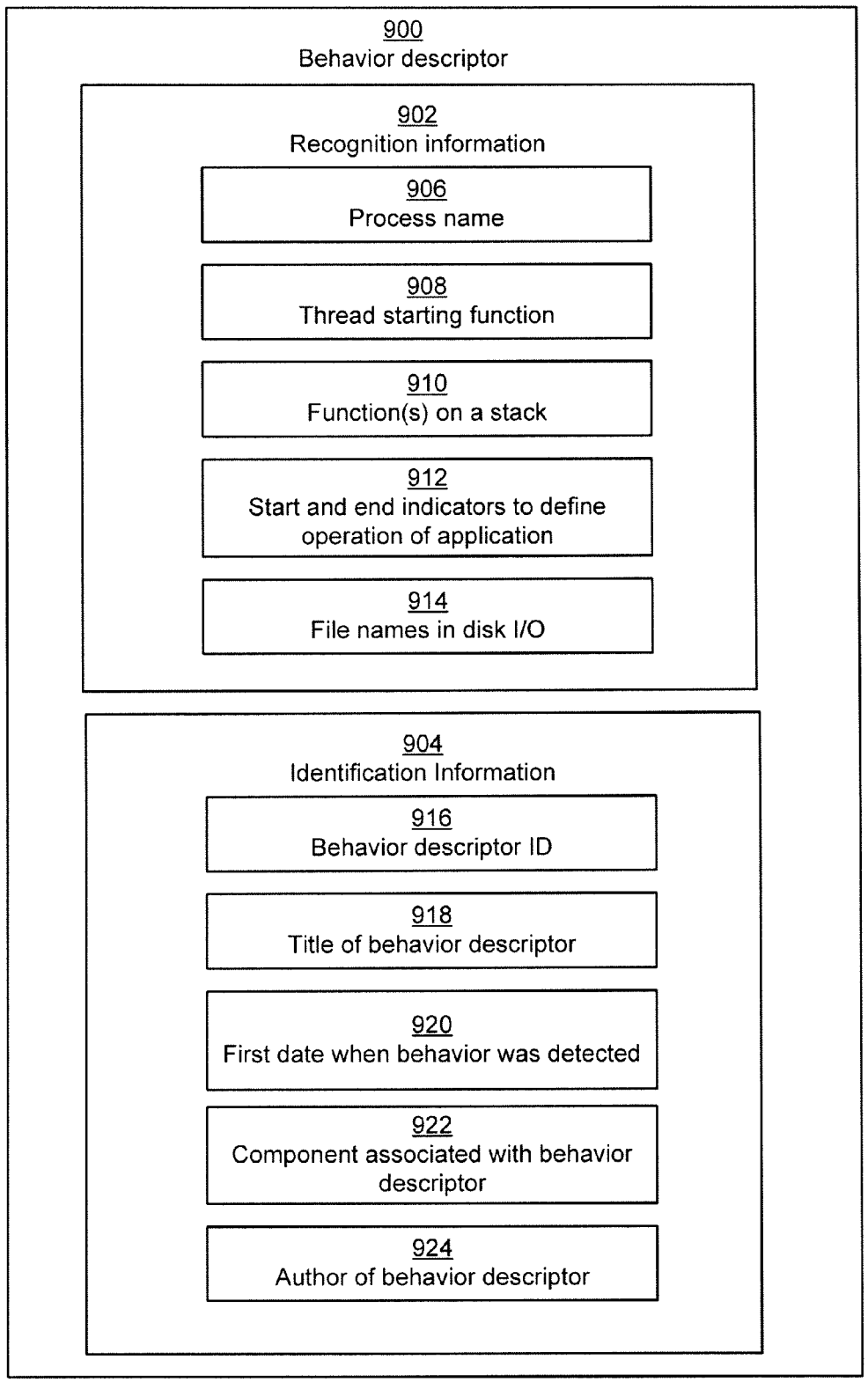
FIG. 9 is a block diagram schematically illustrating attributes of a behavior descriptor, in accordance with some embodiments of the invention.

FIG. 9 illustrates exemplary architecture of a behavior descriptor, including attributes of a behavior descriptor 900. The attributes may be defined using, for example, an XML schema. Though any suitable number and type of attributes may be used, the attributes may generally comprise recognition information 902, also referred to as a body of a behavior descriptor, and identification information 904, which may also be referred to as a metadata.

Recognition information 902 may be used to match behavior descriptor 900 to performance traces which may comprise a sequence of events. Thus, recognition information 902 may define how trace analysis tool 102 (FIG. 1) or other suitable tool may identify whether behavior described by behavior descriptor 900 exists in a performance trace. Identification information 904 may be used to access information on behavior described by behavior descriptor 900 when behavior descriptor 900 matches a performance trace. Identification information 904 may be used to display the information on the behavior identified based on the matching. The information may be displayed on any suitable display (e.g., display 110 in FIG. 1).

In this example, recognition information 902 may comprise attributes such as a process name 906 that identifies process where behavior described by behavior descriptor 900 may be detected, a thread starting function 908, function(s) on a stack 910 that specifies functions in a call stack of an event to identify an activity, a pair, with a start indicator and an end indicator, 912 used to define an operation of an application, and file names in disk input/output (I/O) 914. Recognition information 902 may comprise any other suitable attributes, such as, for example, version information, prior behavior of the thread and others.

Identification information 904, or the metadata, may be used for management and query purposes. Specifically, the metadata may be used to convey behavior described by behavior descriptor 900 to a user in a user-friendly manner. This information may be used, for example to analyze the traces that match the behavior descriptor or to select which behavior descriptors to apply for a particular analysis function.

As shown in FIG. 9, identification information 904 may comprise an identifier of the behavior descriptor defined as a behavior descriptor ID 916, a title of behavior descriptor 918, a date 920 representing when a behavior described in behavior descriptor 900 was first detected, a component 922 associated with the behavior descriptor, and an identifier 924 of an author of behavior descriptor 900.

In some embodiments, identification information on a behavior descriptor may comprise quantitative information of behavior described by the behavior descriptor. For example, when a behavior descriptor describing memory allocation matches a performances trace, the identified behavior (i.e., memory allocation) may be described by a size and a number of memory allocations. As another example, a disk I/O behavior defined by a corresponding behavior descriptor may be reported as a number of disk I/Os, a size of disk I/Os and as any other suitable representation (e.g., a histogram of the disk I/O size. The quantitative information may be presented to a user in any suitable manner.

It should be appreciated that attributes 906-924 are illustrated in FIG. 9 by way of example only and any other suitable attributes may be utilized instead of or in addition to these attributes. For example, in some embodiments, the attributes may comprise a human-understandable description of the behavior descriptor. Furthermore, behavior descriptors may comprise all of attributes 906-924 shown in FIG. 9 or different subsets of these attributes, depending on a category of the behavior descriptors. Behavior descriptors of different categories may be defined using different values of the attributes.

FIG. 10 comprises a snapshot of an interface through which user input may be received to define a behavior descriptor, in accordance with some embodiments of the invention. Such interface may be generated using computer programming techniques as are known in the art and may be provided, for example, by behavior descriptors generation interface 108 (FIG. 1) or by any other suitable component.

In the example illustrated in FIG. 10, the interface comprises an interface area 1000 in which a behavior descriptor is referred to, by way of example only and for simplification of user experience, as a "signature." As shown in FIG. 10, interface area 1000 may comprise fields in which values for attributes, such as "Signature ID," "Title," "Description," "Signature Type," "Category," "Component," and "Author alias," may be displayed or input. Each of these attributes has been assigned a respective value based on input received from a user or from any other source.

For example, the "Signature Type" attribute used to define a type of the behavior descriptor has a value "Basic" meaning that the behavior descriptor describes a relatively easily recognizable behavior which may be identified using the behavior descriptor and addressed as a single issue. As another example, a category of the behavior descriptor being defined is "CPU Usage."

FIG. 10 also illustrates that interface area 1000 comprises fields through which values for attributes constituting recognition information may be displayed or entered. In this example, the recognition information comprises "Process Name" attribute and two different processes named "avgrsx.exe" and "avgrsa.exe," respectively, may comprise behavior described by the behavior descriptor.

In this example, a process of defining the behavior descriptor is in progress, such that values for some attributes of the recognition information have not been assigned a value yet. Specifically, "Thread Start Function," "Duration Filter" defining for how long the behavior may be exhibited, and "Sample Profile Stack" defining what functions can be found on a call stack when the behavior occurs have not yet been inserted into the definition of the behavior descriptor.

Interface area 1000 may be provided by an interactive interface so that any suitable elements (e.g., buttons, user-input-activated symbols, hyperlinks, sliding bars, drop-down menus, etc.) are provided through which the user may instruct execution of certain commands, such as assigning values to attributes of the behavior descriptor. Furthermore, the user may access relevant information, such as an identifier, or an alias ("Author alias"), of a user from whom a user input is received to define the behavior descriptor. Thus, in this example, "Get my name" button may be used to access aliases of different users and select the one associated with the current user. When receiving user input defining the behavior descriptor is complete, the user may activate an "Insert Recognition" symbol so that the behavior descriptor is generated. The behavior descriptor may then be stored in one or more of suitable storage media, such as in behavior descriptors database 106 (FIG. 106).

In addition, as shown in FIG. 10, additional comments may be received from the user. It should be appreciated that interface area 1000 is shown in FIG. 10 by way of example only and other schemas suitable to receive user input defining a behavior descriptor may be substituted. Furthermore, in some embodiments, behavior descriptors may be generated automatically. For example, a suitable system may utilize machine leaning or other techniques to detect behaviors in traces and define behavior descriptors used to identify such behaviors.

FIG. 11 comprises a snapshot of output provided as a result of analysis of a performance trace wherein relationships of behavior descriptors are identified. In this example, behavior descriptor "LC-nt!ExEnterPriorityRegionAndAcquireResourceExclusive" waits on "WS-explorer!CTray_MainThreadProc-explorer" behavior descriptor, which in turn calls "LC-nt!ExEnterPriorityRegionAndAcquireResourceExclusive" behavior descriptor.

Figure 12:
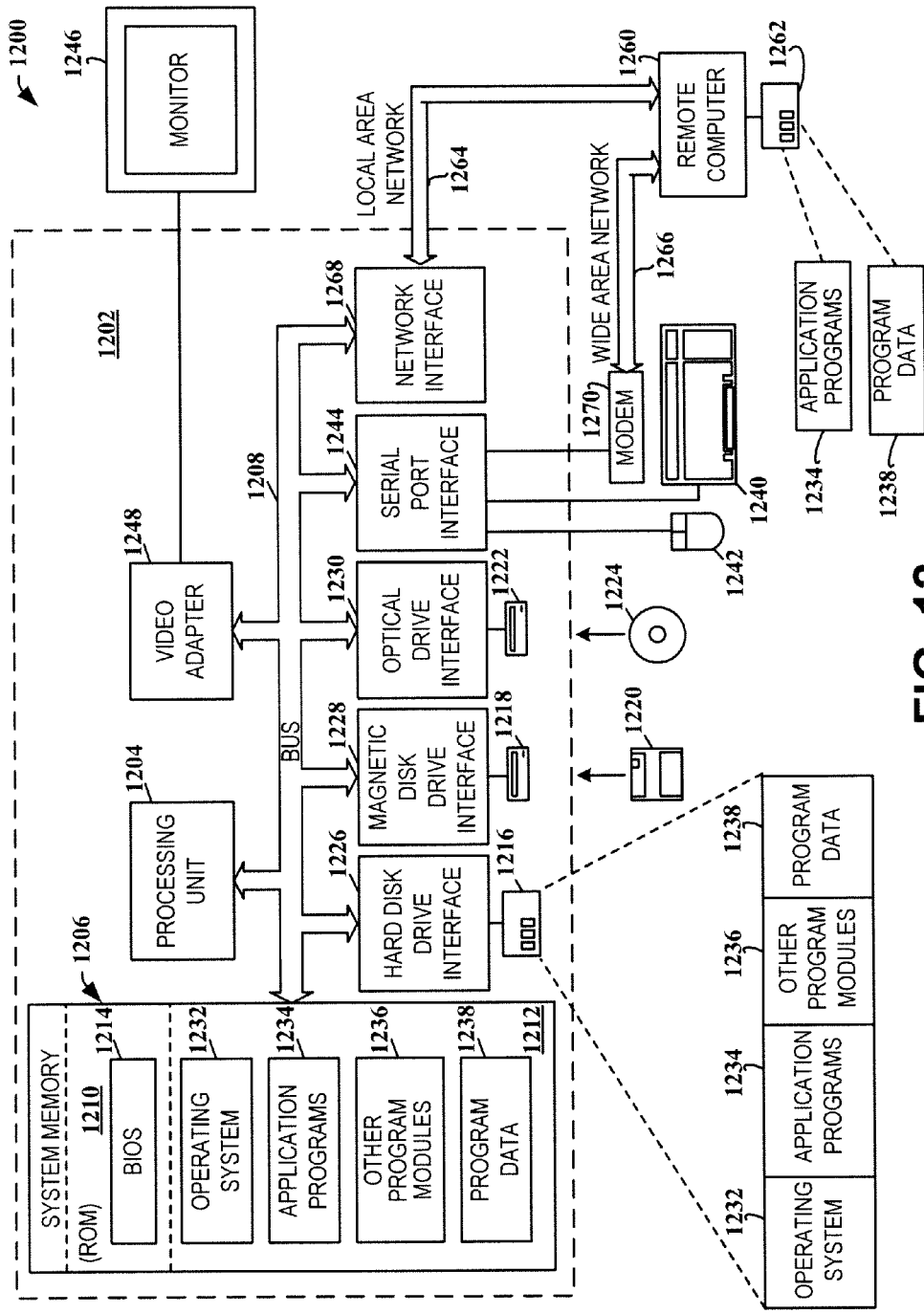
FIG. 12 illustrates an example operating environment in which some embodiments may be implemented.

With reference to FIG. 12, an exemplary system environment 1200 for implementing the various aspects of the embodiments include a conventional computer 1202, including a processing unit 1204, a system memory 1206, and a system bus 1208 that couples various system components, including the system memory, to the processing unit 1204. The processing unit 1204 may be any commercially available or proprietary processor. In addition, the processing unit may be implemented as multi-processor formed of more than one processor, such as may be connected in parallel.

The system bus 1208 may be any of several types of bus structure including a memory bus or memory controller, a peripheral bus, and a local bus using any of a variety of conventional bus architectures such as PCI, VESA, Microchannel, ISA, and EISA, to name a few. The system memory 1206 includes read only memory (ROM) 1210 and random access memory (RAM) 1212. A basic input/output system (BIOS) 1214, containing the basic routines that help to transfer information between elements within the computer 1202, such as during start-up, is stored in ROM 1210.

The computer 1202 also may include, for example, a hard disk drive 1216, a magnetic disk drive 1218, e.g., to read from or write to a removable disk 1220, and an optical disk drive 1222, e.g., for reading from or writing to a CD-ROM disk 1224 or other optical media. The hard disk drive 1216, magnetic disk drive 1218, and optical disk drive 1222 are connected to the system bus 1208 by a hard disk drive interface 1226, a magnetic disk drive interface 1228, and an optical drive interface 1230, respectively. The drives 1216-1222 and their associated computer-readable media provide nonvolatile storage of data, data structures, computer-executable instructions, etc. for the computer 1202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1200, and further that any such media may contain computer-executable instructions for performing the methods of the embodiments.

A number of program modules may be stored in the drives 1216-1222 and RAM 1212, including an operating system 1232, one or more application programs 1234, other program modules 1236, and program data 1238. The operating system 1232 may be any suitable operating system or combination of operating systems. By way of example, the application programs 1234 and program modules 1236 can include an item tagging scheme in accordance with an aspect of an embodiment.

A user can enter commands and information into the computer 1202 through one or more user input devices, such as a keyboard 1240 and a pointing device (e.g., a mouse 1242). Other input devices (not shown) may include a microphone, a joystick, a game pad, a satellite dish, a wireless remote, a scanner, or the like. These and other input devices are often connected to the processing unit 1204 through a serial port interface 1244 that is coupled to the system bus 1208, but may be connected by other interfaces, such as a parallel port, a game port or a universal serial bus (USB). A monitor 1246 or other type of display device is also connected to the system bus 1208 via an interface, such as a video adapter 1248. In addition to the monitor 1246, the computer 1202 may include other peripheral output devices (not shown), such as speakers, printers, etc.

It is to be appreciated that the computer 1202 can operate in a networked environment using logical connections to one or more remote computers 1260. The remote computer 1260 may be a workstation, a server computer, a router, a peer device or other common network node, and typically includes many or all of the elements described relative to the computer 1202, although for purposes of brevity, only a memory storage device 1262 is illustrated in FIG. 12. The logical connections depicted in FIG. 12 can include a local area network (LAN) 1264 and a wide area network (WAN) 1266. Such networking environments are commonplace in offices, enterprise-wide computer networks, intranets and the Internet.

When used in a LAN networking environment, for example, the computer 1202 is connected to the local network 1264 through a network interface or adapter 1268. When used in a WAN networking environment, the computer 1202 typically includes a modem (e.g., telephone, DSL, cable, etc.) 1270, or is connected to a communications server on the LAN, or has other means for establishing communications over the WAN 1266, such as the Internet. The modem 1270, which can be internal or external relative to the computer 1202, is connected to the system bus 1208 via the serial port interface 1244. In a networked environment, program modules (including application programs 1234) and/or program data 1238 can be stored in the remote memory storage device 1262. It will be appreciated that the network connections shown are exemplary and other means (e.g., wired or wireless) of establishing a communications link between the computers 1202 and 1260 can be used when carrying out an aspect of an embodiment.

In accordance with the practices of persons skilled in the art of computer programming, the embodiments have been described with reference to acts and symbolic representations of operations that are performed by a computer, such as the computer 1202 or remote computer 1260, unless otherwise indicated. Such acts and operations are sometimes referred to as being computer-executed. It will be appreciated that the acts and symbolically represented operations include the manipulation by the processing unit 1204 of electrical signals representing data bits which causes a resulting transformation or reduction of the electrical signal representation, and the maintenance of data bits at memory locations in the memory system (including the system memory 1206, hard drive 1216, floppy disks 1220, CD-ROM 1224, and remote memory 1262) to thereby reconfigure or otherwise alter the computer system's operation, as well as other processing of signals. The memory locations where such data bits are maintained are physical locations that have particular electrical, magnetic, or optical properties corresponding to the data.

Having thus described several aspects of at least some embodiments of the invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable memory encoded with computer-executable instructions for performing operations to analyze a performance trace, the operations comprising:

comparing a plurality of behavior descriptors to the performance trace, respective behavior descriptors of the plurality of behavior descriptors comprising a plurality of attributes, the plurality of attributes comprising recognition information characterizing another performance trace that matches that respective behavior descriptor, the recognition information further comprising at least one of a process name, a thread starting function, at least one function on a stack, a pair comprising a start indicator and an end indicator defining an operation of an application, and at least one file name;

determining, based on the comparing, that at least one behavior descriptor from the plurality of behavior descriptors matches at least one portion of the performance trace; and in response to determining that the at least one behavior descriptor matches the at least one portion of the performance trace, accessing information on behavior associated with the at least one matching behavior descriptor.

2. The computer-readable memory of claim 1, wherein the operations further comprise:

identifying a hierarchical relationship between at least two behavior descriptors of the plurality of behavior descriptors.

3. The computer-readable memory of claim 1, wherein comparing the plurality of behavior descriptors to the performance trace comprises:

determining that a first behavior descriptor from the plurality of behavior descriptors matches a first thread that is waiting on a second thread that matches a second behavior descriptor from the plurality of behavior descriptors; and in response to determining that the first behavior descriptor matches the first thread that is waiting on the second thread that matches the second behavior descriptor, determining that the first behavior descriptor is waiting on the second behavior descriptor.

4. The computer-readable memory of claim 1, wherein comparing the plurality of behavior descriptors to the trace comprises:

determining that a first behavior descriptor from the plurality of behavior descriptors calls a second behavior descriptor from the plurality of behavior descriptors if the performance trace is associated with a component in a call stack and the first behavior descriptor matches a first portion of the performance trace; and calling, by the component in the call stack, another component in the call stack, wherein the other component is associated with a second portion of the performance trace that matches a second behavior descriptor from the plurality of behavior descriptors.

5. The computer-readable memory of claim 1, wherein comparing the plurality of behavior descriptors to the trace comprises:

determining that a first behavior descriptor from the plurality of behavior descriptors matches the performance trace;

determining that a second behavior descriptor from the plurality of behavior descriptors matches the performance trace, wherein the second behavior descriptor describes a second behavior pattern that is more specific than a first behavior pattern described by the first behavior descriptor; and in response to determining that the first behavior descriptor matches the performance trace and the second behavior descriptor matches the performance trace, determining that the first behavior descriptor is a superset of the second behavior descriptor.

6. The computer-readable memory of claim 1, wherein the plurality of attributes further comprise identification information for accessing the information on the behavior associated with the at least one matching behavior descriptor and for analyzing the behavior.

7. The computer-readable memory of claim 6, wherein the identification information comprises at least an identifier of a behavior descriptor of the plurality of behavior descriptors, a title of the behavior descriptor, a date associated with a detection of behavior represented by the behavior descriptor, a component associated with the behavior descriptor, or an identifier of an author of the behavior descriptor.

8. The computer-readable memory of claim 1, wherein the operations further comprise:

displaying the information on the behavior associated with the at least one matching behavior descriptor on a display.

9. A method, executed by a processor, of analyzing at least one performance trace using a plurality of behavior descriptors, the method comprising:

comparing a first behavior descriptor from the plurality of behavior descriptors to the at least one performance trace;

comparing a second behavior descriptor from the plurality of behavior descriptors to the at least one performance trace;

determining that the first behavior descriptor and the second behavior descriptor match the at least one performance trace;

determining a relationship between the first behavior descriptor and the second behavior descriptor; and in response to determining that the first behavior descriptor and the second behavior descriptor match the at least one performance trace, determining that the at least one performance trace exhibits a behavior associated with the relationship between the first behavior descriptor and the second behavior descriptor.

10. The method of claim 9, wherein determining the relationship between the first behavior descriptor and the second behavior descriptor comprises at least one of:

determining a hierarchical relationship between the first behavior descriptor and the second behavior descriptor; and determining that a first behavior described by the first behavior descriptor depends on a second behavior described by the second behavior descriptor.

11. The method of claim 9, wherein determining the relationship between the first behavior descriptor and the second behavior descriptor comprises determining that the first behavior descriptor calls the second behavior descriptor.

12. The method of claim 9, wherein determining the relationship between the first behavior descriptor and the second behavior descriptor comprises determining that the first behavior descriptor is waiting on the second behavior descriptor.

13. The method of claim 9, wherein determining the relationship between the first behavior descriptor and the second behavior descriptor comprises determining that:

the first behavior descriptor is a superset of the second behavior descriptor; and/or that the first behavior descriptor overlaps with the second behavior descriptor.

14. The method of claim 9, further comprising:

identifying at least one performance issue associated with behavior represented by the at least one performance trace; and determining a solution to address the at least one performance issue based on first information associated with the first behavior descriptor and second information associated with the second behavior descriptor.

15. The method of claim 10, further comprising:

comparing a third behavior descriptor from the plurality of behavior descriptors to the at least one performance trace;

determining a relationship between the second behavior descriptor and the third behavior descriptor including:

determining a hierarchical relationship between the second behavior descriptor and the third behavior descriptor; and determining that the second behavior described by the second behavior descriptor depends on a third behavior described by the third behavior descriptor.

16. At least one computer-readable memory encoded with computer-executable instructions that, when executed by at least one processor, implement a method for defining at least one behavior descriptor, the method comprising:

receiving first user input specifying recognition information on the at least one behavior descriptor, the recognition information defining characteristics of a trace;

receiving second user input specifying identification information on the at least one behavior descriptor, the identification information identifying information on an event indicative of a match between the at least one behavior descriptor and the trace; and generating a behavior descriptor based on the first and second user inputs.

17. The at least one computer-readable memory of claim 16, wherein the identification information comprises at least one of an identifier of the at least one behavior descriptor, a title of the at least one behavior descriptor, a date representing when the behavior described in the at least one behavior descriptor was detected, a component associated with the at least one behavior descriptor, and an identifier of an author of the at least one behavior descriptor.

18. The at least one computer-readable memory of claim 16, wherein the recognition information comprising at least one of a process name, a thread starting function, at least one function on a stack, a start and end indicators that define an operation of an application, and at least one file name.

19. The at least one computer-readable memory of claim 16, wherein the first user input and the second user input is received using an XML schema.

20. The at least one computer-readable memory of claim 16, wherein the method further comprises storing the generated behavior descriptor as part of a library of behavior descriptors.

* * * * *

UNITED STATES PATENT AND TRADEMARK OFFICE
CERTIFICATE OF CORRECTION

Page 1 of 1

PATENT NO.      : 8,499,197 B2
APPLICATION NO. : 12/946228
DATED           : July 30, 2013
INVENTOR(S)     : Hsiao et al.

It is certified that error appears in the above-identified patent and that said Letters Patent is hereby corrected as shown below:

In the Specification,

In column 14, line 35, delete "my" and insert -- may --, therefor.

Signed and Sealed this
Seventeenth Day of February, 2015

Michelle K. Lee
*Deputy Director of the United States Patent and Trademark Office*